United States Patent
Nakata

(10) Patent No.: US 9,943,917 B2
(45) Date of Patent: Apr. 17, 2018

(54) GEAR EDGE CUT-OFF TOOL AND GEAR EDGE CUT-OFF DEVICE

(71) Applicant: KREUZ CO., LTD., Kariya-shi, Aichi-ken (JP)

(72) Inventor: Syuichi Nakata, Kariya (JP)

(73) Assignee: KREUZ CO., LTD., Kariya (JP)

( * ) Notice: Subject to any disclaimer, the term of this patent is extended or adjusted under 35 U.S.C. 154(b) by 32 days.

(21) Appl. No.: 15/339,479

(22) Filed: Oct. 31, 2016

(65) Prior Publication Data
US 2017/0259360 A1    Sep. 14, 2017

(30) Foreign Application Priority Data

Mar. 9, 2016   (JP) .................................. 2016-046119
Mar. 9, 2016   (JP) .................................. 2016-046120

(51) Int. Cl.
*B23F 19/10*    (2006.01)
*B23F 21/28*    (2006.01)
*B23F 19/06*    (2006.01)

(52) U.S. Cl.
CPC .............. *B23F 21/28* (2013.01); *B23F 19/06* (2013.01); *B23F 19/101* (2013.01); *Y10T 409/101113* (2015.01)

(58) Field of Classification Search
CPC . Y10T 409/101113; Y10T 409/101272; Y10T 409/50246; B23F 19/00; B23F 19/06; B23F 19/10; B23F 19/101; B23F 21/04; B23F 21/28; B23D 13/00
See application file for complete search history.

(56) References Cited

U.S. PATENT DOCUMENTS

| | | | |
|---|---|---|---|
| 2,668,480 A * | 2/1954 | Christman | ............ B23F 19/101 409/9 |
| 4,548,531 A | 10/1985 | Seitelman et al. | |
| 2017/0368624 A1* | 12/2017 | Nakata | .................... B23F 21/00 |

FOREIGN PATENT DOCUMENTS

| | | |
|---|---|---|
| EP | 1022082 A2 | 7/2000 |
| FR | 1092442 A | 4/1955 |
| JP | S41-014067 | 6/1966 |
| JP | S41-104067 Y | 6/1966 |
| JP | S64-38223 U | 3/1989 |
| JP | H10-180542 A | 7/1998 |
| JP | 2002-283140 A | 10/2002 |
| JP | 2012-206226 A | 10/2012 |
| JP | 5550187 B2 | 7/2014 |

OTHER PUBLICATIONS

U.S. Appl. No. 15/622,776, filed Jun. 14, 2017 in the name of Syuichi Nakata et al.

* cited by examiner

*Primary Examiner* — Daniel Howell
(74) *Attorney, Agent, or Firm* — Oliff PLC

(57) ABSTRACT

An object is to provide a gear edge cut-off tool and a gear edge cut-off device capable of suppressing variation in the amount to cut off side edges of a gear. A gear edge cut-off tool of the present invention has a shape, in a first main plane (rake face) of a first cutting blade portion capable of cutting off a side edge of a gear wheel, that is curved or bent in a concave shape in an edge line direction.

20 Claims, 24 Drawing Sheets

GEAR EDGE CUT-OFF TOOL AND GEAR EDGE CUT-OFF DEVICE

BACKGROUND OF THE INVENTION

Field of the Invention

The present invention relates to a gear edge cut-off tool and a gear edge cut-off device for cutting off a gear tooth edge.

Description of the Related Art

As this type of gear edge cut-off tool, conventionally known is one that includes a cutting blade to be applied with an edge line crossed obliquely with respect to a side edge of an involute gear tooth (an edge created by a tooth surface-tooth surface of the tooth and a gear side face crossing each other) (refer to, for example, Patent Literature 1). With this tool, the side edge can be cut off from a dedendum side toward an addendum side by relatively moving the cutting blade in a tooth thickness direction with respect to the tooth.

CITATION LIST

Patent Literature

Patent Literature 1: Japanese Patent No. 5550187 ([0036] and FIG. 7)

SUMMARY OF THE INVENTION

Problems to be Solved by the Invention

However, with the conventional gear edge cut-off tool described above, the width of a dedendum-side machined surface of the side edge of a gear tooth sometimes greatly differs from the width of an addendum-side machined surface, so an improvement in machining quality has been demanded.

The present invention has been made in view of the above-described circumstances, and it is an object of the present invention to provide a gear edge cut-off tool and a gear edge cut-off device capable of an improvement in machining quality from the conventional ones.

Means of Solving the Problems

A first aspect of the present invention made to achieve the above-described object is a gear edge cut-off tool including a cutting blade to be disposed between adjoining teeth of a gear and applied with an edge line obliquely crossed to a side edge of one tooth, the cutting blade cutting off the side edge from a dedendum side toward an addendum side while gradually coming out in a face width direction from between the adjoining teeth when the cutting blade is relatively moved in a tooth thickness direction with respect to the tooth, in which a rake face of the cutting blade is curved or bent in a concave shape in the edge line direction.

DESCRIPTION OF THE EMBODIMENTS

First Embodiment

Figure 1:
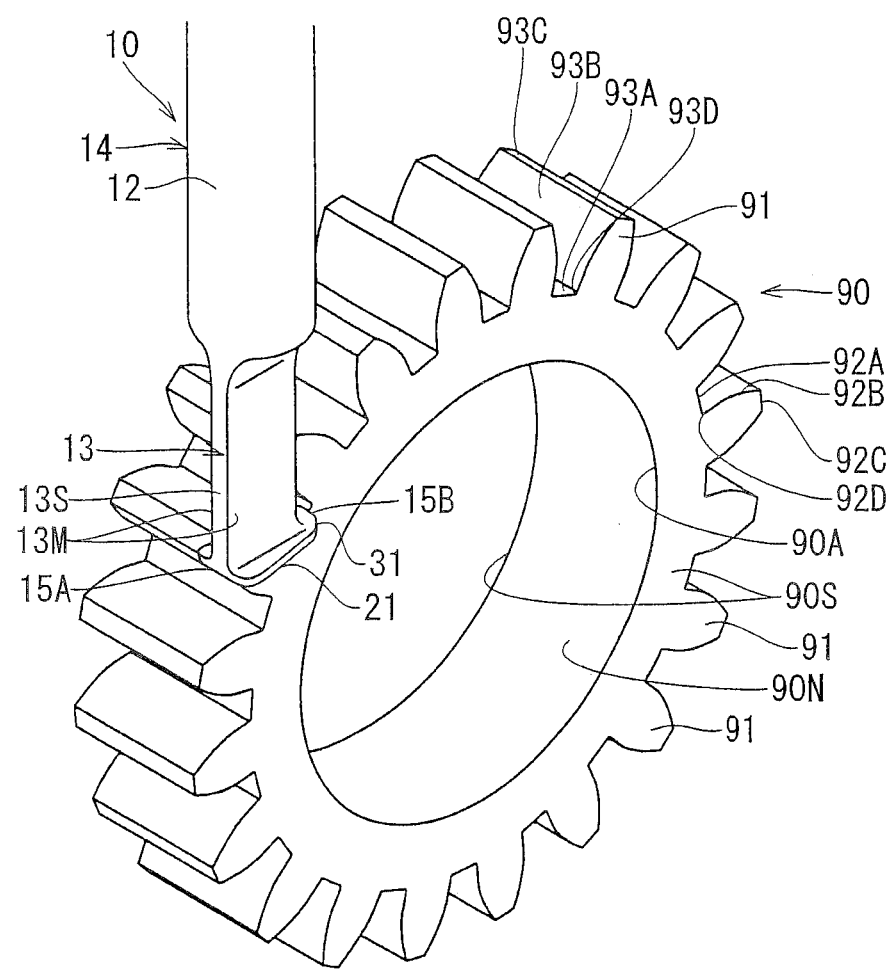
FIG. 1 is a perspective view of a gear edge cut-off tool and a gearwheel according to a first embodiment of the present invention.

Hereinafter, an embodiment of the present invention will be described based on FIG. 1 to FIG. 12. FIG. 1 shows a gear edge cut-off tool 10 of the present embodiment and a spur gear 90 (hereinafter, simply referred to as a "gear wheel 90") as an example of a gear being an object to be machined by the gear edge cut-off tool 10.

Figure 2:
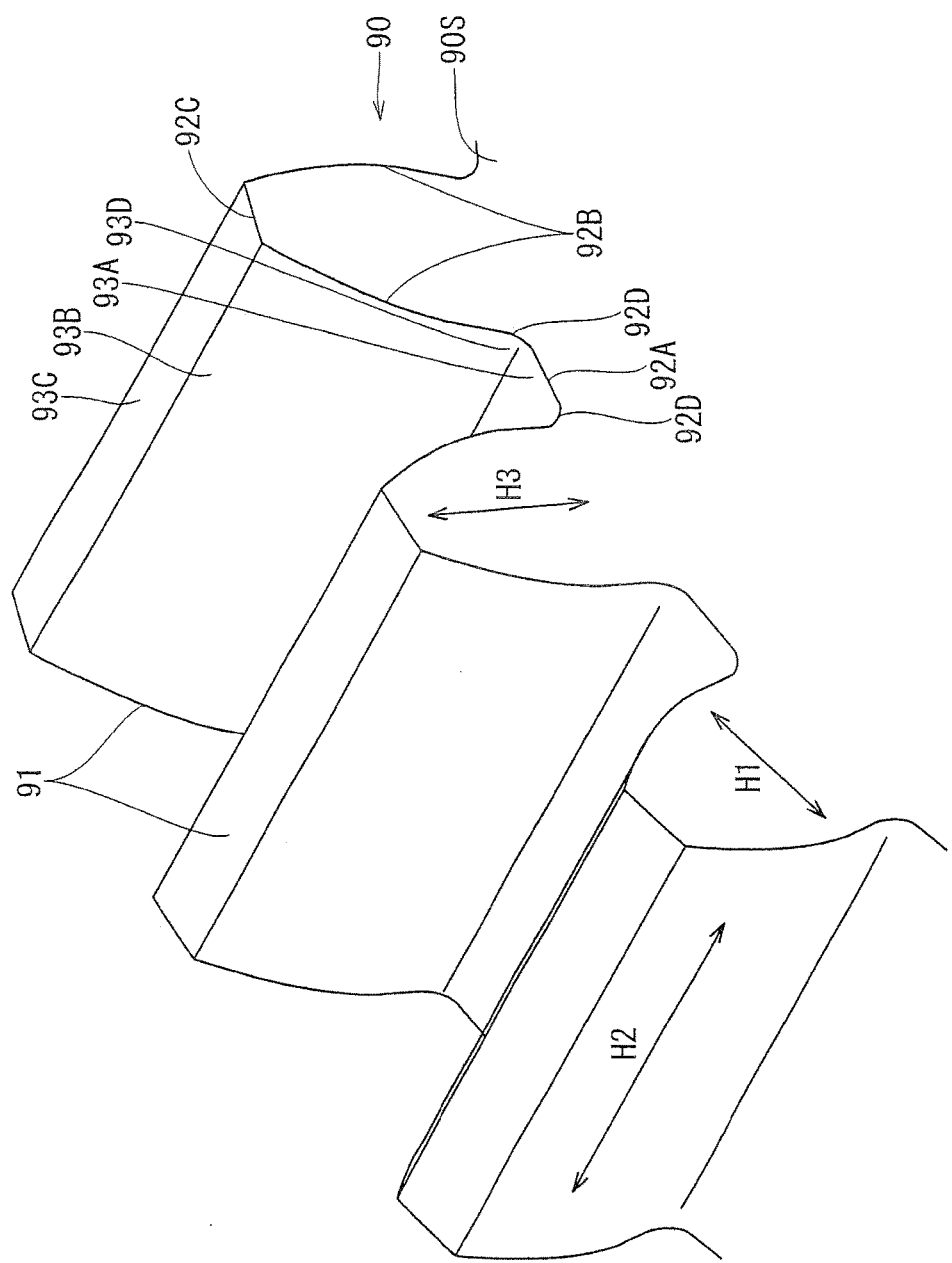
FIG. 2 is a perspective view of the gear wheel enlarged in part.

The gear wheel 90 is an involute gear and shows, for example, a cylindrical shape having a plurality of teeth 91 on an outer peripheral surface. Gear side faces 90S and 90S at both axial ends of the gear wheel 90 are provided as flat surfaces as a whole. Further, as shown in FIG. 2 in an enlarged manner, a tooth surface 93B of the tooth 91 is provided as an involute curved surface and is bulged in a tooth thickness direction H1. An inner peripheral surface 90N (refer to FIG. 1) of the gear wheel 90 and a bottom land 93A and a top land 93C form concentric circles, and between the bottom land 93A and the tooth surfaces 93B, corner curved surfaces 93D and 93D that are continuous thereto are provided.

The gear wheel 90 is manufactured by, for example, cutting a metal material by a bobbing cutter or the like. At this time, burrs may remain at an edge of the gear wheel 90 where the gear side face 90S is orthogonal to another face. Even if no burrs remain, a part of the edge can be chipped off as a metal piece due to stress concentrated thereon. Moreover, the burrs or metal piece that enters a meshing plane between the gear wheels 90 and 90 causes an increase in the rotational resistance of the gear wheel 90 or wear of the gear wheel 90. Therefore, in order to remove the burrs and edges of the gear wheel 90, the gear edge cut-off tool 10 of the present embodiment is used.

Specifically, the gear wheel 90 includes a top edge 92C created by the gear side face 90S and the top land 93C crossing each other, a side edge 92B created by the gear side face 90S and the tooth surface 93B crossing each other, a bottom edge 92A created by the gear side face 90S and the bottom land 93A crossing each other, a corner edge 92D created by the gear side face 90S and the corner curved surface 93D crossing each other, and an inner edge 90A (refer to FIG. 1) created by the gear side face 90S and the inner peripheral surface 90N crossing each other. The gear edge cut-off tool 10 is used in order to remove the side edge 92B and the bottom edge 92A and the corner edge 92D therebetween. In addition, the other edges (the top edge 92 and the inner edge 90A) are removed by another tool (not shown).

Figure 3:
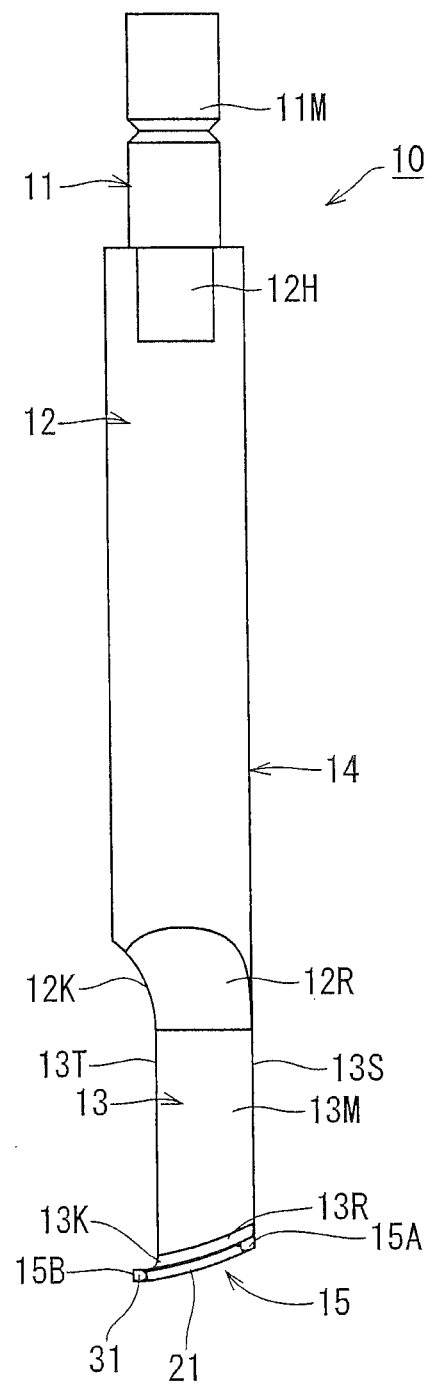
FIG. 3 is a side view of the gear edge cut-off tool.

As shown in FIG. 3, the gear edge cut-off tool 10 has a structure for which a distal end plate portion 15 is provided at the distal end of a shaft portion 14, and is fabricated by, for example, so-called machining from a rod-shaped base material. The shaft portion 14 is made up of a small diameter portion 11, a large diameter portion 12, and a band plate portion 13 that are arranged from its proximal end side toward the distal end. The small diameter portion 11 has a circular shape in section and occupies on the order of approximately ⅕ of the overall length of the gear edge cut-off tool 10. At an axial center of the small diameter portion 11, a V-shaped groove 11M is formed around the entire circumference.

The large diameter portion 12 has a circular shape in section and occupies more than a half of the overall length of the gear edge cut-off tool 10. In a proximal end portion of the large diameter portion 12, positioning planes 12H and 12H are formed at two locations separated circumferentially by 180 degrees.

Figure 4:
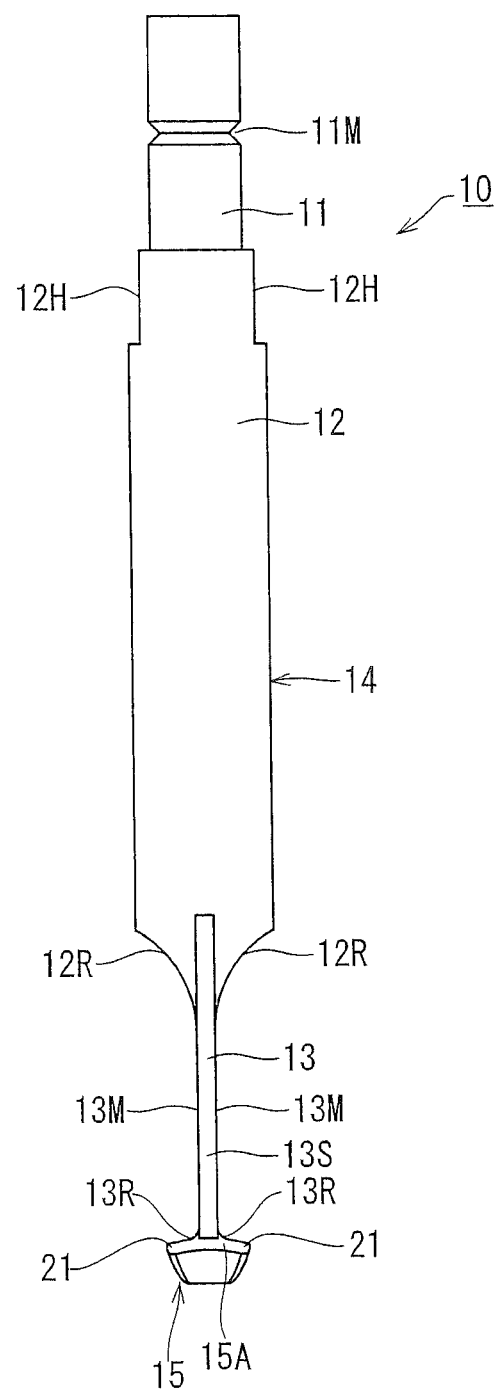
FIG. 4 is a side view of the gear edge cut-off tool.

As shown in FIG. 4, the band plate portion 13 has main planes 13M and 13M that are parallel to the positioning planes 12H and 12H, and the band plate portion 13 has a plate thickness that is approximately ⅕ the diameter of the large diameter portion 12. As shown in FIG. 3, a side face 13S at one widthwise side of the band plate portion 13 is a circular arc surface that is continuous to an outer peripheral surface of the large diameter portion 12. On the other hand, the other side face 13T of the band plate portion 13 is provided as a flat surface and disposed at a position close to the center of the large diameter portion 12 relative to the one side face 13S. Moreover, at a boundary part between the band plate portion 13 and the large diameter portion 12, a curved surface 12K that is continuous to the side face 13T and a curved surface 12R that is continuous to the main plane 13M as shown in FIG. 4 are formed.

Figure 5:
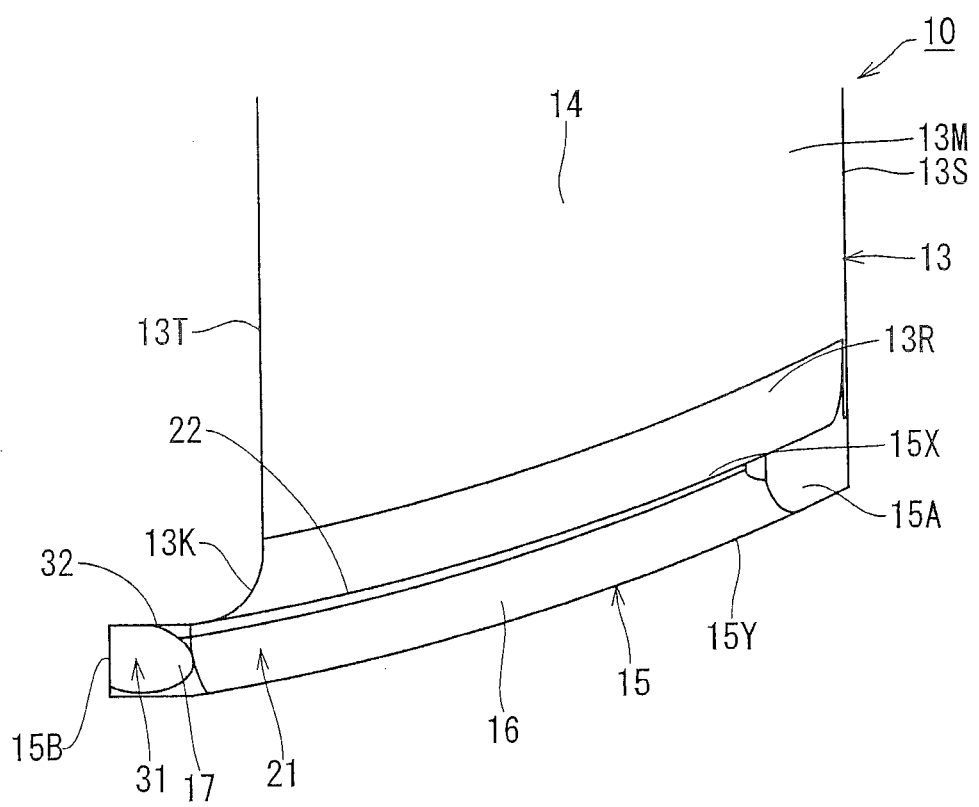
FIG. 5 is a partially enlarged side view of a distal end portion of the gear edge cut-off tool.
Figure 6:
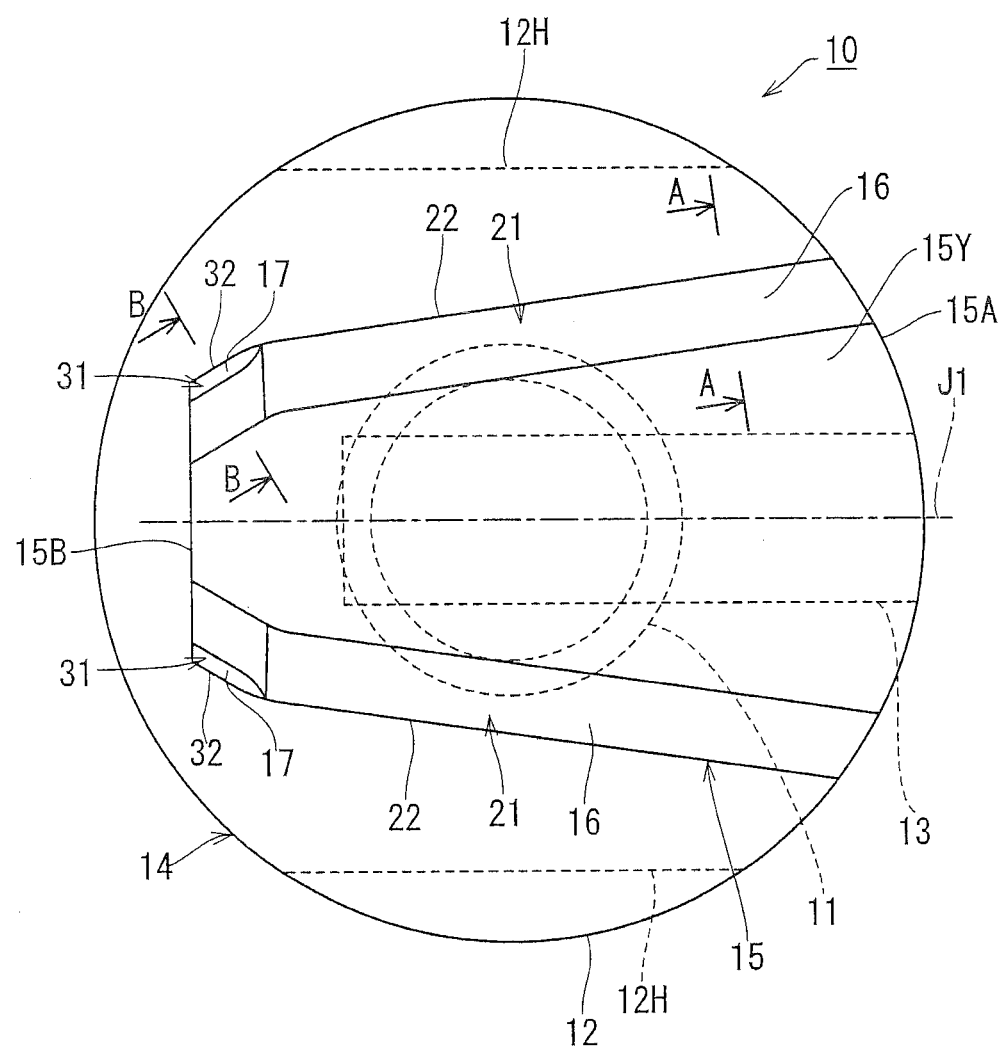
FIG. 6 is a plan view of the gear edge cut-off tool.

As shown in FIG. 6, the distal end plate portion 15 has a left-right symmetric shape as viewed in an axial direction of the shaft portion 14. Of the side faces of the distal end plate portion 15, a first side face 15A at one side in the direction in which a center line of symmetry J1 extends has a circular arc surface flush with the outer peripheral surface of the large diameter portion 12 and the side face 13S (refer to FIG. 3), and a second side face 15B at the other end side is provided as a plane orthogonal to the center line of symmetry J1. Between the first side face 15A and the second side face 15B, third side faces 16 and 16 are provided in a pair symmetrically left to right. End portions of the third side faces 16 and 16 close to the second side face 15B are cut off to form fourth side faces 17 and 17. Moreover, in the distal end plate portion 15, provided are a pair of first cutting blade portions 21 and 21 (which correspond to "cutting blades" of the present invention) using the first main plane 15X (refer to FIG. 5) of the distal end plate portion 15 close to the shaft portion 14 as a rake face and using the third side face 16 as a relief face and a pair of second cutting blade portions 31 and 31 using the first main plane 15X as a rake face and using the fourth side face 17 as a relief face.

Figure 7A:
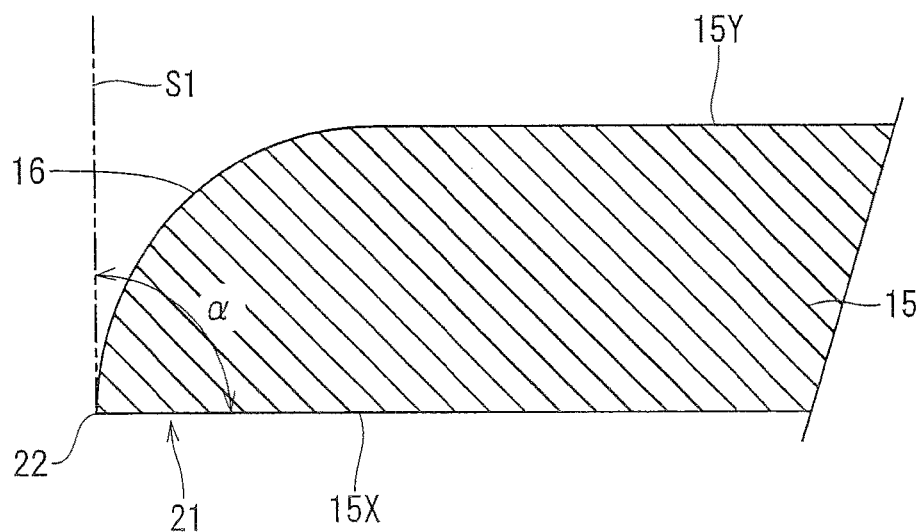
FIG. 7A is a sectional view of a section taken along A-A in FIG. 6.
Figure 7B:
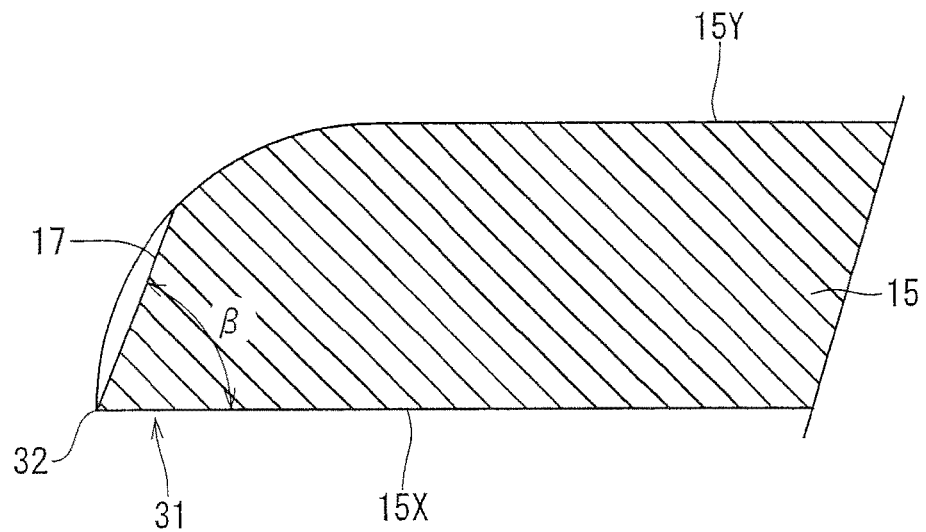
FIG. 7B is a sectional view of a section taken along B-B in FIG. 6.

As shown in FIG. 7A, the distal end plate portion 15 has the first main plane 15X, a second main plane 15Y at the side opposite to the first main plane 15X of the distal end plate portion 15, and the third side face 16 connecting between the first main plane 15X and the second main plane 15Y. The third side face 16 has a circular arc shape as a whole, and one end portion of the third side face 16 is continuous to the second main plane 15Y, while the other end portion of the third side face 16 is orthogonal to the first main plane 15X. That is, a contact face S1 with a part orthogonal to the first main plane 15X of the third side face 16 crosses the first main plane 15X at approximately 90 degrees (refer to a in FIG. 7A). Moreover, as shown in FIG. 7(B), a part of the distal end plate portion 15 which the contact face S1 cuts away when the contact face S1 is laid down toward the third side face 16 around the crossing part with the first main plane 15X is cut off to form a fourth side face 17. A crossing angle β of the relief face (fourth side face 17) with respect to the rake face (first main plane 15X) of the second cutting blade portion 31 is accordingly smaller than the crossing angle α of the relief face (third side face 16) with respect to the rake face (first main plane 15X) of the first cutting blade portion 21.

As shown in FIG. 7A, a ridgeline created by the first main plane 15X and the third side face 16 crossing each other forms a first edge line 22 as an edge line of the first cutting blade portion 21. Moreover, as shown in FIG. 6, the right and left first edge lines 22 and 22 extend linearly, from both end portions of the first side face 15A to positions closer to the second side face 15B, so as to approximate each other as they approach the second side face 15B. As shown in FIG. 7(B), a ridgeline created by the first main plane 15X and the fourth side face 17 crossing each other forms a second edge line 32 as an edge line of the second cutting blade portion 31. Moreover, as shown in FIG. 6, the right and left second edge lines 32 and 32 extend in circular arc shapes that continue from end portions of the first edge lines 22 and 22 and approximate toward the center line of symmetry J1 as they separate from the first edge lines 22 and 22, and extend from halfway linearly to the second side face 15B.

Here, as shown in FIG. 5, the first main plane 15X of the distal end plate portion 15 is curved so as to gradually approach the band plate portion 13 as they extend from an end portion close to the second side face 15B toward an end portion close to the first side face 15A. The curved shape is formed as substantially the same shape as that when the side edge 92B of the gear wheel 90 mentioned above is viewed in a face width direction H2. That is, the first main plane 15X (rake face) is provided as an involute curved surface substantially the same in shape as the tooth surface 93B. In addition, at a boundary part between the band plate portion 13 and the distal end plate portion 15, a curved surface 13K that is continuous to the first main plane 15X and the side face 13T of the band plate portion 13 and a curved surface 13R that is continuous to the first main plane 15X and the main plane 13M of the band plate portion 13 are formed.

Figure 8:
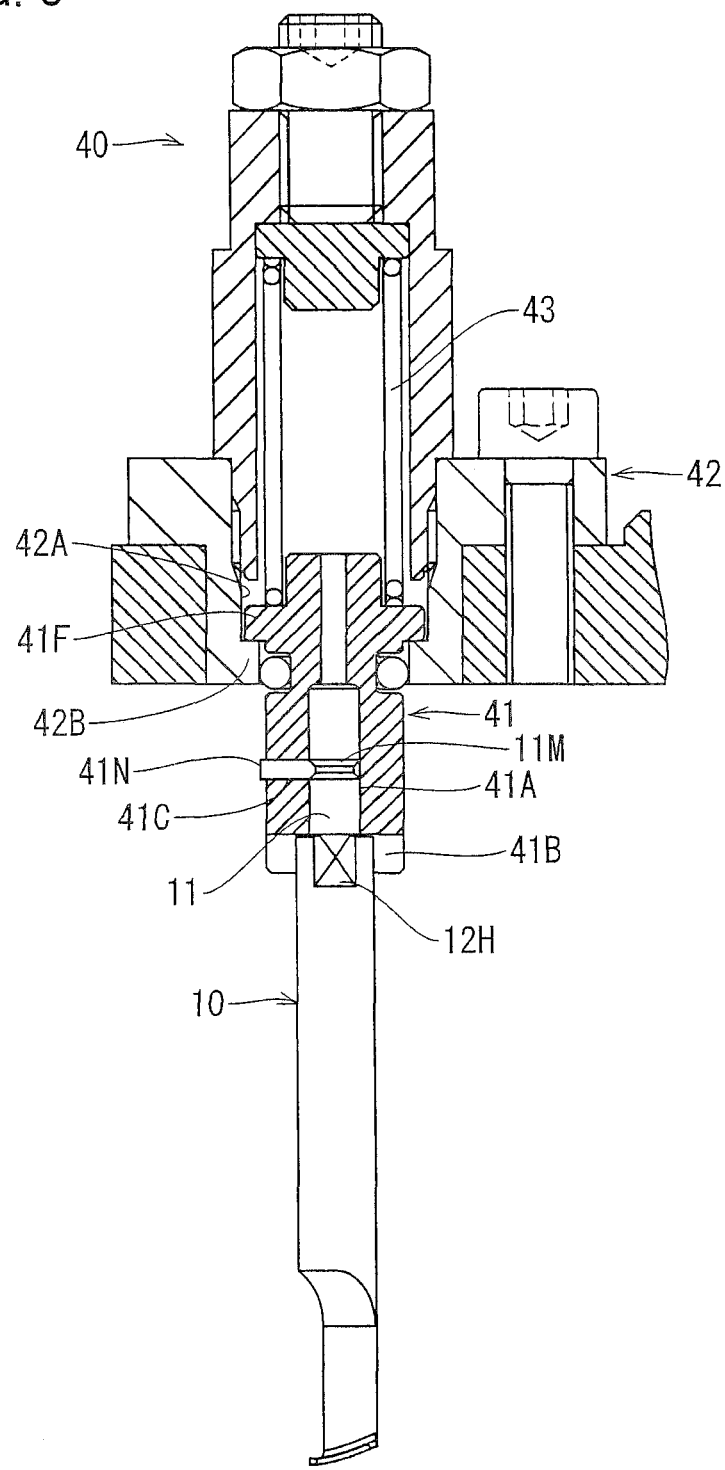
FIG. 8 is a side sectional view of a tool holder.

FIG. 8 shows an example of a tool holder 40 in which the gear edge cut-off tool 10 is mounted. The tool holder 40 is identical in basic structure to the one disclosed in Japanese Patent No. 5550187. The tool holder 40 includes a movable member 41 and a support member 42 that supports the movable member 41 so as to be tiltable in an arbitrary direction. The movable member 41 has a columnar shape, has a tool holding hole 41A in a center portion, and is vertically divided in a front end portion into a pair of rotation stopper walls 41B (only one rotation stopper wall 41B is shown in FIG. 8). At an axial middle portion of the movable member 41, a screw hole 41C is formed that communicates with the movable member 41 from the side. Moreover, while the small diameter portion 11 of the gear edge cut-off tool 10 is inserted in the tool holding hole 41A and the positioning planes 12H and 12H of the gear edge cut-off tool 10 are adjacent to inner faces of the pair of rotation stopper walls 41B, a screw 41N tightened into the screw hole 41C is engaged with the V-shaped groove 11M of the small diameter portion 11, so that the gear edge cut-off tool 10 is fixed to the movable member 41.

From a side face of the movable member 41, a flange 41F having a substantially regular polygonal shape (for example, a regular hexagonal shape) overhangs. A side face of the flange 41F has a circular arc shape between both front and rear surfaces of the flange 41F. Moreover, the flange 41F is fitted with a regular hexagonal support hole 42A formed in the support member 42. The support hole 42A has a positioning abutting wall 42B overhanging to the inside from its front end portion, and a compression coil spring 43 integrated in the support member 42 biases the flange 41F to the front so as to bring about a state in which a front face of the flange 41F is abutted against the positioning abutting wall 42B. Accordingly, the gear edge cut-off tool 10 in a state of being restricted from a rotation about its center axis tilts together with the movable member 41 in an arbitrary direction with respect to the support member 42, and the flange 41F is biased so as to reach the origin posture of surface abutment against the positioning abutting wall 42B.

Figure 9:
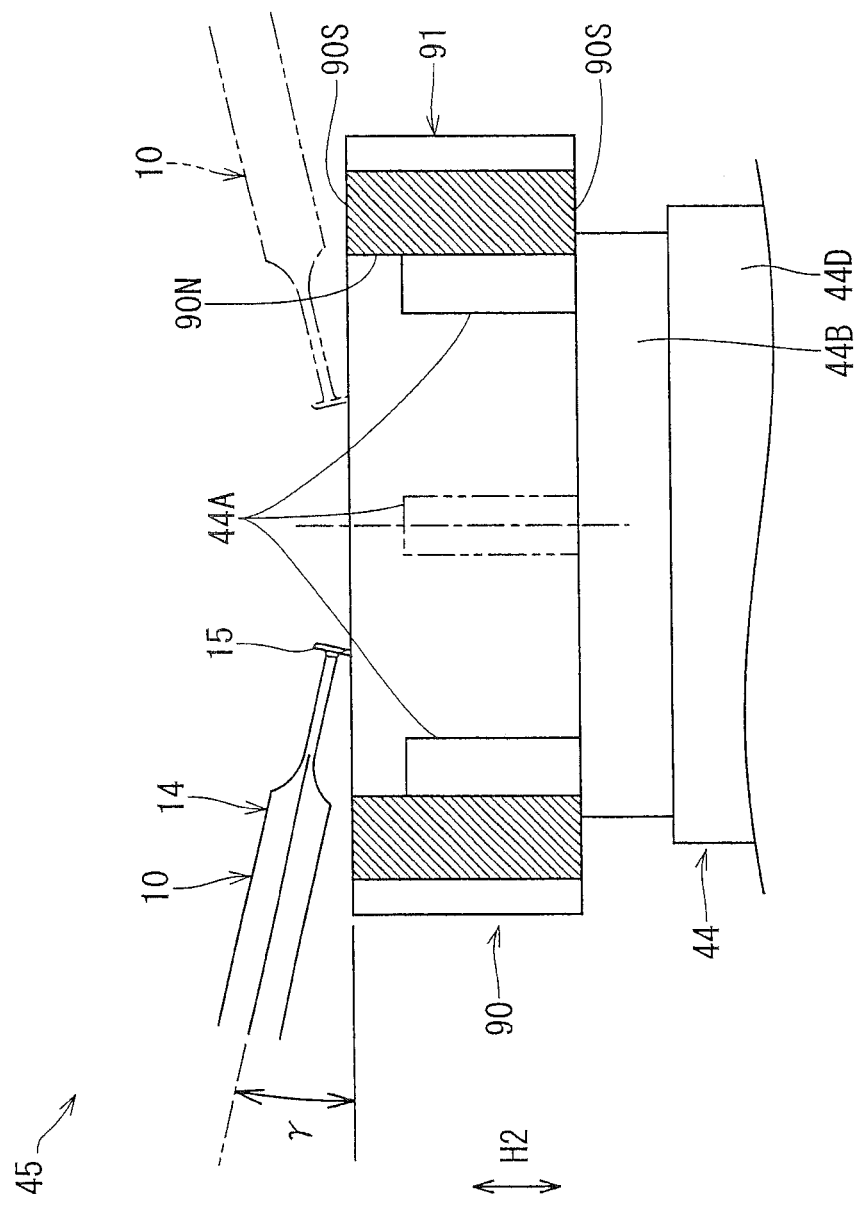
FIG. 9 is a partial side view of the gear wheel mounted on a rotating jig.

FIG. 9 shows a rotating jig 44 according to the present invention. The rotating jig 44 has a turntable 44B that is driven to rotate by receiving the power of a motor (not shown). From positions to divide an outer edge portion of an end face of the turntable 44B into three equal parts, for example, three latching pawls 44A project, and are supported so as to be tiltable in a radial direction of the turntable 44B. Moreover, the latching pawls 44A are biased so as to move toward the center of the turntable 44B due to air (not shown). The latching pawls 44A move to a side to separate from the center of the turntable 44B when it receives a compression air pressure via a rotary joint (not shown) provided between the turntable 44B and a base portion 44D that rotatably supports the latching pawls 44A. Accordingly, when the latching pawls 44A are inserted inside the gear wheel 90 to make the gear side face 90S abut against the end face of the turntable 44B and the latching pawls 44A are moved to the outside, the gear wheel 90 is centered with respect to the turntable 44B and fixed so as to be rotatable integrally. In addition, the rotating jig 44 and the tool holder 40 (refer to FIG. 8) described above compose a gear edge cut-off device 45 according to the present invention in the present embodiment.

Figure 10A:
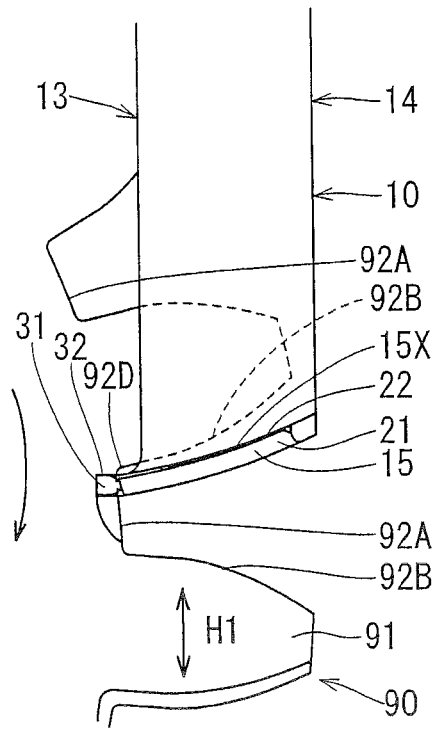
FIG. 10A is a side view of the gear edge cut-off tool during cutting off a bottom edge, viewed in a face width direction.
Figure 10B:
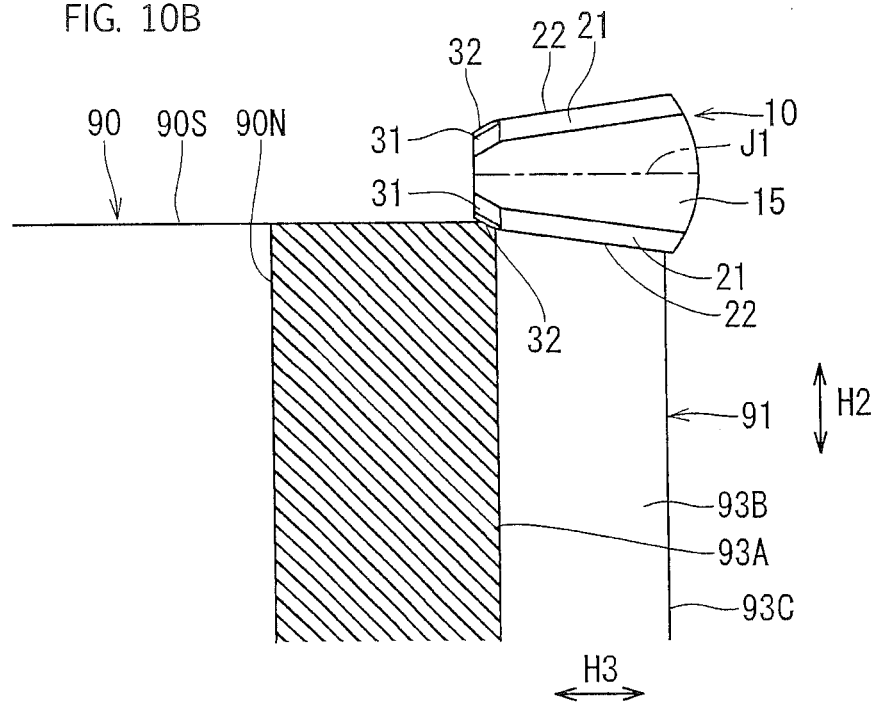
FIG. 10B is a side view of the gear edge cut-off tool during cutting off a bottom edge, viewed in a tooth thickness direction.

The constitution of the gear edge cut-off tool 10 and the gear edge cut-off device 45 of the present embodiment is described above. Next, operation and effects of the gear edge cut-off tool 10 and the gear edge cut-off device 45 will be described. The tool holder 40 (refer to FIG. 8) is set so that the gear edge cut-off tool 10 has the following arrangement with respect to the gear wheel 90 mounted on the gear edge cut-off device 45. That is, as shown in FIG. 10B, the center line of symmetry J1 in the distal end plate portion 15 of the gear edge cut-off tool 10 is disposed in parallel with the gear side face 90S of the gear wheel 90, and the second edge line 32 that is an edge line of the second cutting blade portion 31 located at one side of the distal end plate portion 15 further than the center line of symmetry J1 is made to abut against the bottom edge 92A of the gear wheel 90 as shown in FIG. 10A to store the first cutting blade portions 21 at the one side between adjoining teeth 91 and 91 as shown in FIG. 10B. The shaft portion 14 of the gear edge cut-off tool 10 is inclined by a predetermined angle (y degrees in FIG. 9) with respect to the gear side face 90S as shown in FIG. 9 to bring the second edge line 32 into a state of being crossed obliquely with respect to the bottom edge 92A of the gear wheel 90 as viewed in a tooth depth direction H3 (refer to FIG. 2) of the tooth 91 of the second edge line 32.

Figure 11A:
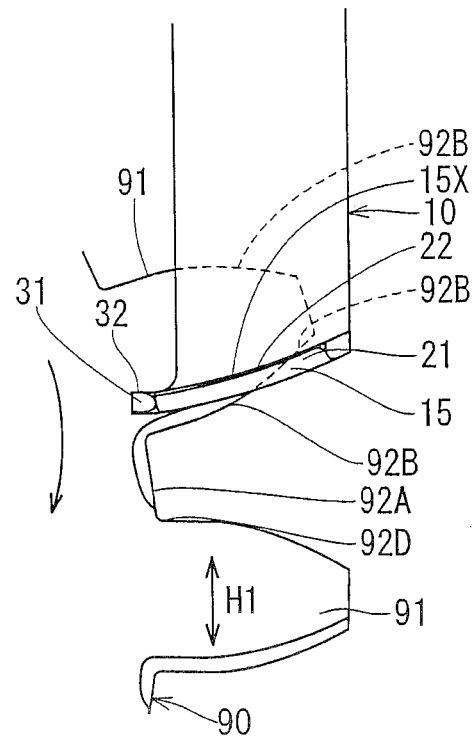
FIG. 11A is a side view of the gear edge cut-off tool during cutting off a side edge, viewed in a face width direction.

Moreover, as shown by the arrow in FIG. 10A, when the gear wheel 90 is driven to rotate to one side by the gear edge cut-off device 45, the distal end plate portion 15 relatively moves the gear edge cut-off tool 10 to one side in the tooth thickness direction H1 with respect to the tooth 91 so as to approximate the side edge 92B of the tooth 91 with its side of the first main plane 15X facing the front. Then, the second cutting blade portion 31 cuts off the bottom edge 92A while moving onward and reaches the corner edge 92D to also cut off the corner edge 92D. Here, when the second cutting blade portion 31 moves along the corner edge 92D, an abutting position against the gear wheel 90 in the second cutting blade portion 31 moves to the side close to the first cutting blade portion 21 of the second cutting blade portion 31, and the distal end plate portion 15 accordingly gradually comes out in the face width direction H2 (refer to FIG. 10B) from between the adjoining teeth 91 and 91. An abutting position against the gear wheel 90 in the gear edge cut-off tool 10 then moves from the second cutting blade portion 31 to the first cutting blade portion 21, and the corner edge 92D is cut off by the first cutting blade portion 21. The first cutting blade portion 21 before long reaches the side edge 92B, and as shown in FIG. 11A, the first edge line 22 that is an edge line of the first cutting blade portion 21 reaches a state of crossing obliquely with respect to the side edge 92B as viewed in the face width direction H2, and as shown in FIG. 11B, the first edge line 22 that is an edge line of the first cutting blade portion 21 reaches a state of crossing obliquely with respect to the side edge 92B as viewed in the tooth thickness direction H1.

Figure 11B:
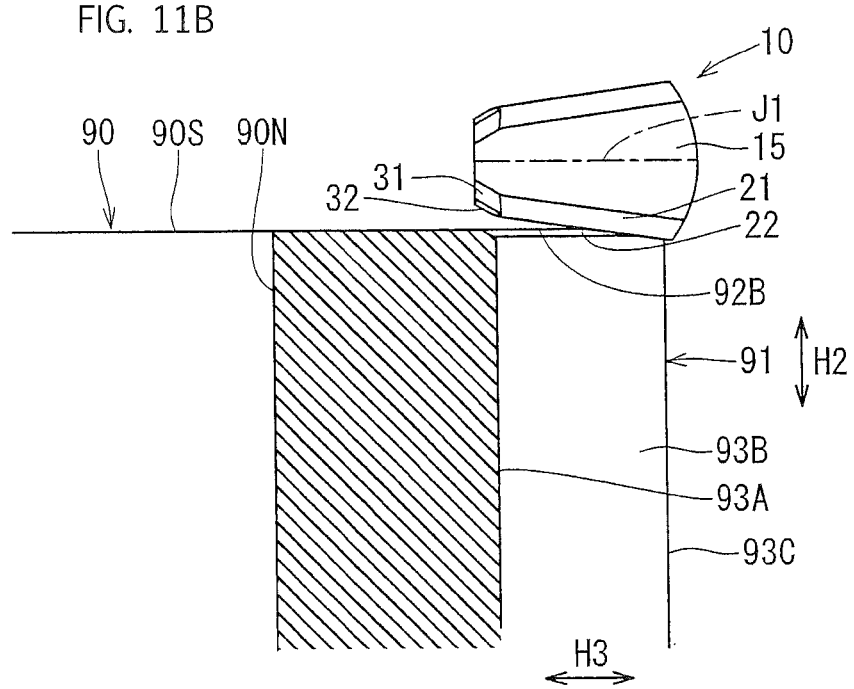
FIG. 11B is a side view of the gear edge cut-off tool during cutting off a side edge, viewed in a tooth thickness direction.

When the gear edge cut-off tool 10 relatively moves further therefrom to the one side in the tooth thickness direction H1 with respect to the tooth 91, the first cutting blade portion 21 cuts off the side edge 92B from a dedendum side toward an addendum side while gradually coming out in the face width direction H2 (refer to FIG. 2 and FIG. 11B)

from between the adjoining teeth 91 and 91, and the gear edge cut-off tool 10 moves to between next adjoining teeth 91 and 91.

Figure 12:
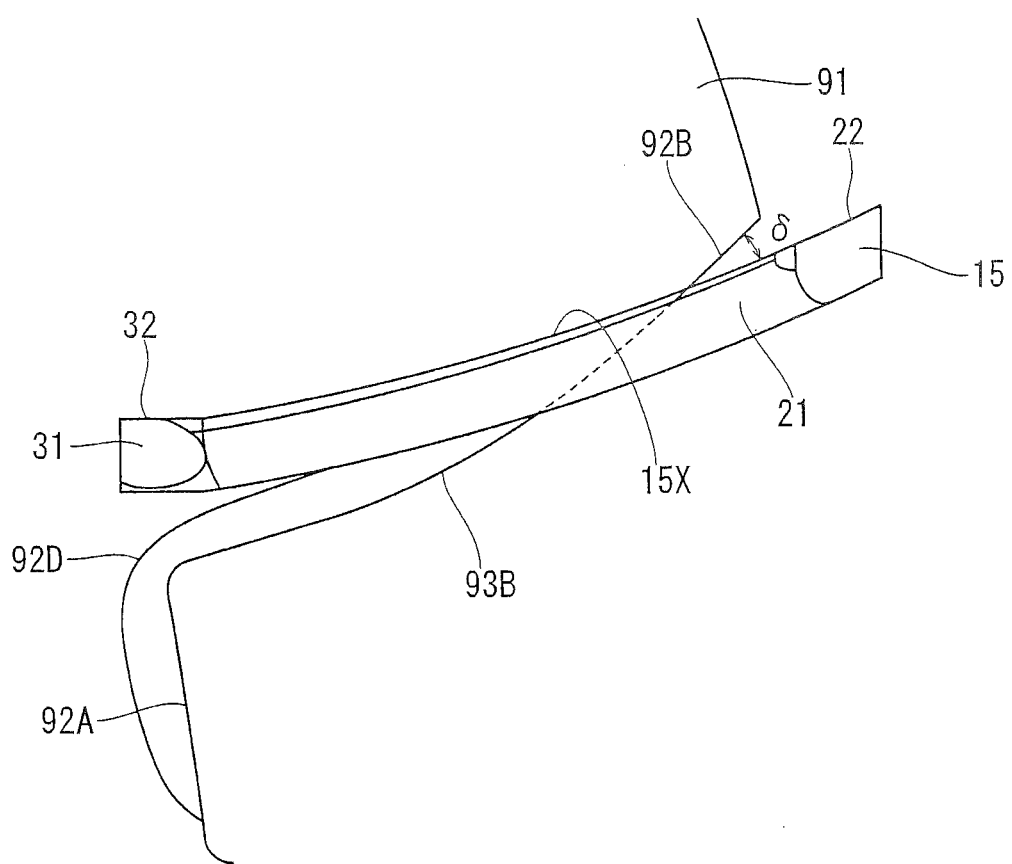
FIG. 12 is a side view of the gear edge cut-off tool during cutting off a side edge, viewed in a face width direction.

At this time, the gear edge cut-off tool 10 of the present embodiment has the rake face (first main plane 15X) formed as an involute curved surface substantially the same in shape and size as the tooth surface 93B. Accordingly, as shown in FIG. 12, the gear edge cut-off tool 10 can relatively move to one side in the tooth thickness direction H1 with respect to the tooth 91 with the crossing angle of the tooth surface 93B (third side face 16) with respect to the rake face (first main plane 15X) of the first cutting blade portion 21 as viewed in the face width direction H2 maintained substantially constant. That is, a contact angle δ of the first edge line 22 with the side edge 92B is maintained substantially constant.

By then rotating the gear wheel 90 a turn or a few turns, the bottom edge 92A and one corner edge 92D and one side edge 92B at one end side in the face width direction H2 of each tooth 91 of the gear wheel 90 are brought into a cut-off state.

Subsequently, the gear edge cut-off tool 10 shown by the solid lines in FIG. 9 is moved to a position to become symmetric left to right with respect to a reference plane that includes a center axis of the gear wheel 90 and is parallel to the center line of symmetry J1 of the distal end plate portion 15 of the gear edge cut-off tool 10 (that is, moved to the position of the gear edge cut-off tool 10 shown by the alternate long and two short dashed lines in FIG. 9) to dispose the first cutting blade portion 21 at the side not used the last time between adjoining teeth 91 and 91 and make the second edge line 32 of the second cutting blade portion 31 abut against the bottom edge 92A so as to rotate the gear wheel 90 reversely to the last time. Alternately, with respect to a reference plane that includes a center axis of the gear wheel 90 and is orthogonal to the center line of symmetry J1 of the distal end plate portion 15 of the gear edge cut-off tool 10, the first cutting blade portion 21 at the side not used the last time is disposed between adjoining teeth 91 and 91 and the second edge line 32 of the second cutting blade portion 31 is made to abut against the bottom edge 92A so as to rotate the gear wheel 90 reversely to the last time. The other corner edge 92D and the other side edge 92B at the one end side in the face width direction H2 of each tooth 91 of the gearwheel 90 are thereby cut off. That is, the gear edge cut-off tool 10 brings all of the side edges 92B, the corner edges 92D, and the bottom edges 92A at the one end side in the face width direction H2 of the teeth 91 into a cut-off state. By performing the same processing, all of the side edges 92B, the corner edges 92D, and the bottom edges 92A at the other end side in the face width direction H2 of the teeth 91 can be cut off by the gear edge cut-off tool 10.

As above, according to the gear edge cut-off tool 10 of the present embodiment, the contact angle δ of the first edge line 22 with the side edge 92B can be maintained substantially constant as a result of the first main plane 15X (rake face) being provided in the same shape and nearly comparable in size to the tooth surface 93B, and therefore, simply relatively moving in the tooth thickness direction H1 with respect to the tooth 91 of the gear wheel 90 allows making the amount to cut off the side edge 92B of each tooth 91 of the gear wheel 90 substantially uniform. That is, the side edge 92B has substantially uniform widths of machined surfaces at the dedendum side and the addendum side, which allows an improvement in the machining quality of the side edge 92B.

Moreover, simply relatively moving the gear edge cut-off tool 10 in the tooth thickness direction H1 with respect to the tooth 91 of the gear wheel 90 allows efficiently cutting off both of the side edges 92B and the bottom edge 92A of each tooth 91 of the gearwheel 90. Further, providing the crossing angle β (refer to FIG. 7B) between the rake face and relief face of the second cutting blade portion 31 smaller than the crossing angle α (refer to FIG. 7A) between the rake face and relief face of the first cutting blade portion 21 allows a favorable balance of the cut-off amount between the side edge 92B and the bottom edge 92A.

In addition, the gear edge cut-off tool 10 of the present embodiment described above includes the first cutting blade portions 21 and the second cutting blade portions 31 symmetrically, and the same gear edge cut-off tool 10 is used in both cases where the gear wheel 90 is rotated to one side and is rotated to the other side, but separate gear edge cut-off tools may be provided for the cases where the gear wheel 90 is rotated to one side and is rotated to the other side. Also, the gear edge cut-off tool 10 of the present embodiment is used with the center line of symmetry JI disposed in parallel with the gear side face 90S of the gear wheel 90, but may be used with the center line of symmetry JI disposed out of parallel.

Second Embodiment

Figure 13A:
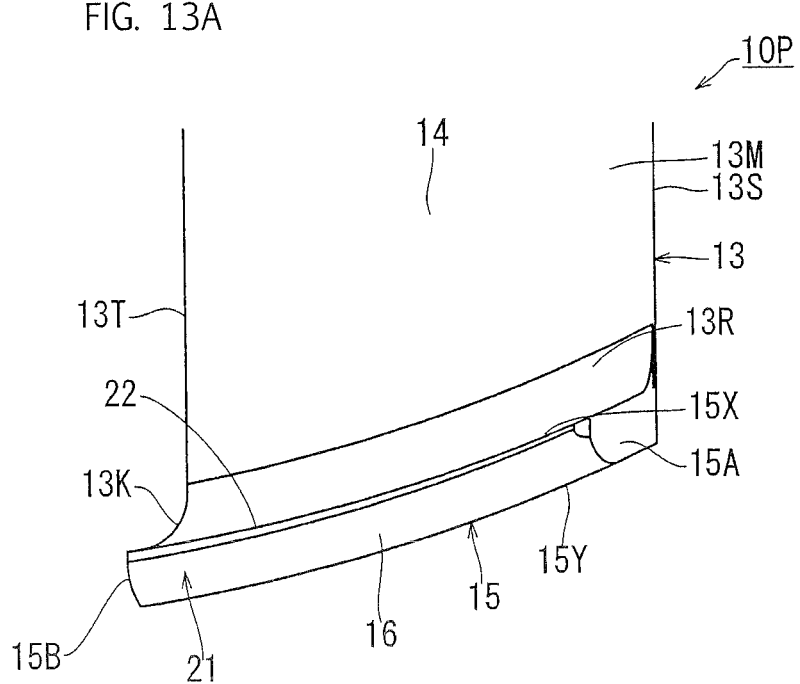
FIG. 13A is a partially enlarged side view of a distal end portion of a gear edge cut-off tool of a second embodiment.
Figure 13B:
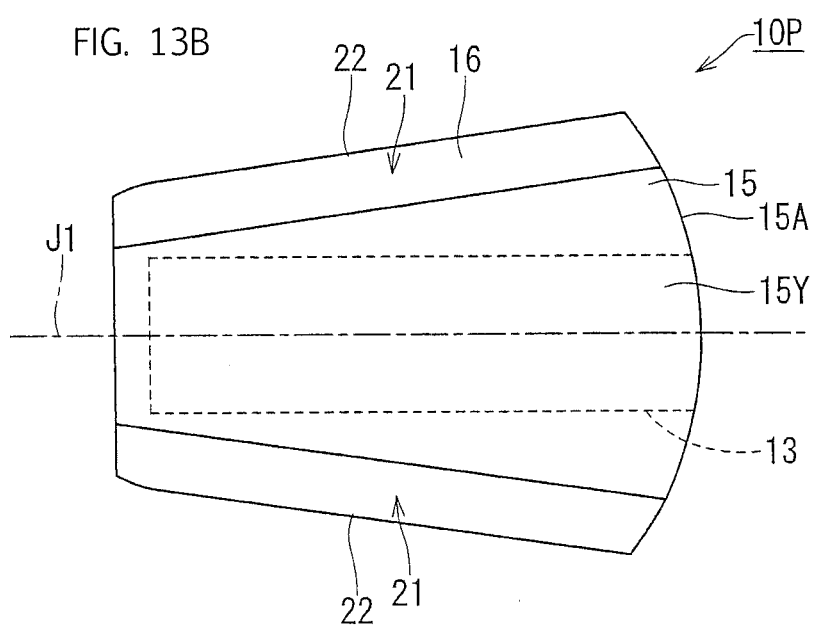
FIG. 13B is a plan view of the gear edge cut-off tool.

FIG. 13 shows a distal end plate portion 15 of a gear edge cut-off tool 10P of a second embodiment of the present invention. As shown in the same figure, the gear edge cut-off tool 10P has no second cutting blade portions 31, which is unlike the first embodiment, and is composed only of first cutting blade portions 21. In the present embodiment, the same parts as those in the above first embodiment are denoted by the same reference signs in the drawings to omit overlapping descriptions. The same applies to embodiments that follow.

Third Embodiment

Figure 14:
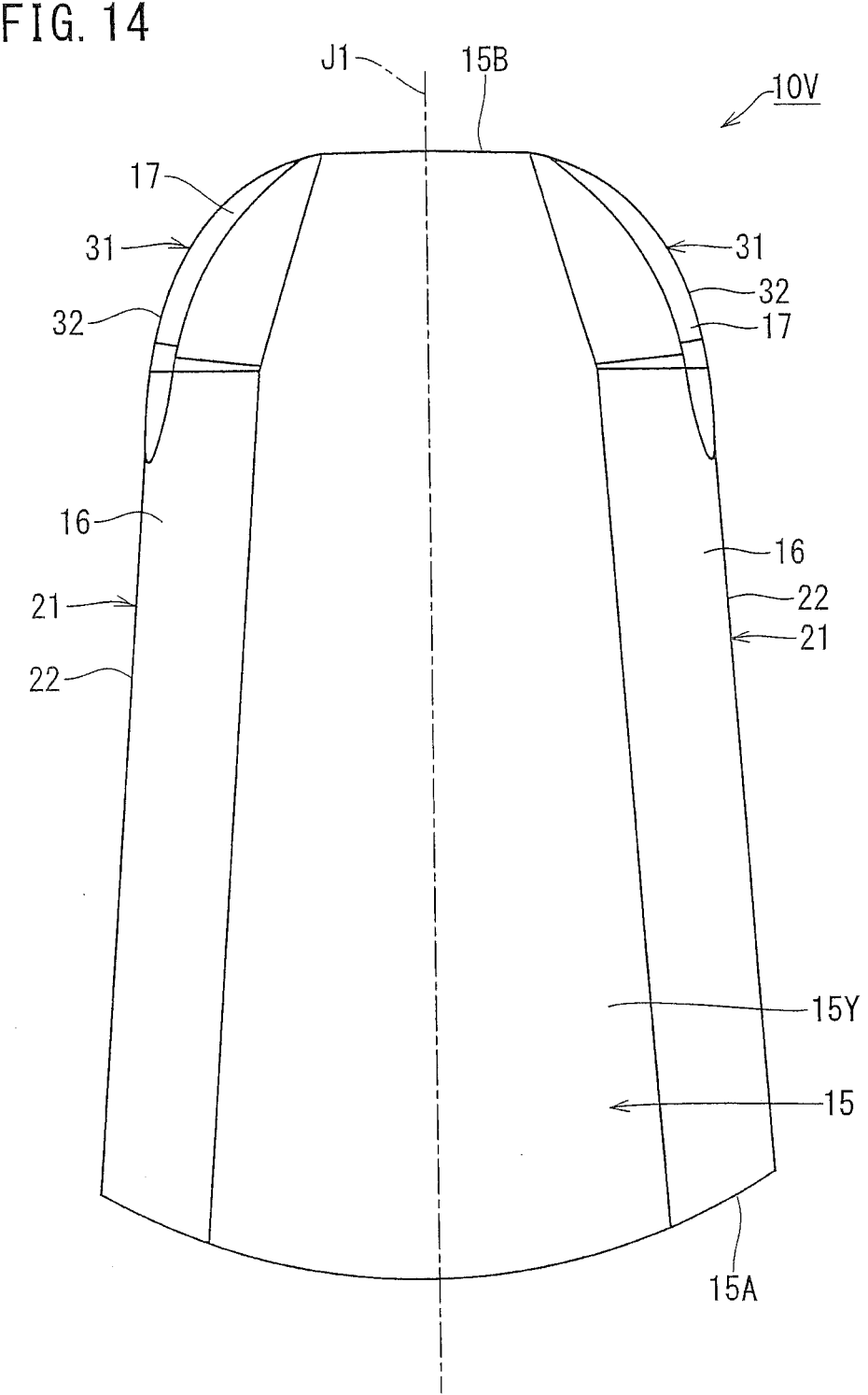
FIG. 14 is a plan view of a gear edge cut-off tool of a third embodiment.

FIG. 14 shows a distal end plate portion 15 of a gear edge cut-off tool 10V of a third embodiment of the present invention. As shown in the same figure, the gear edge cut-off tool 10V has second edge lines 32 that are as a whole in circular arc shapes continuous to first edge lines 22.

Fourth Embodiment

Figure 15:
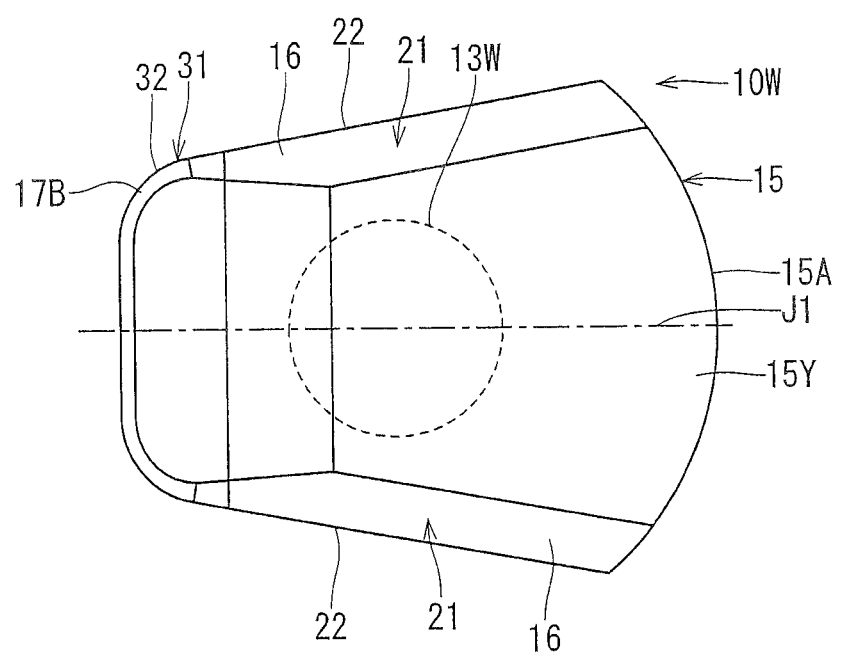
FIG. 15 is a partially enlarged side view of a distal end portion of a gear edge cut-off tool of a fourth embodiment.

FIG. 15 shows a gear edge cut-off tool 10W of a fourth embodiment of the present invention. This gear edge cut-off tool 10W has a structure for which a single second cutting blade portion 31 connects between a pair of first cutting blade portions 21 and 21. Specifically, both end portions of the second edge line 32 have circular arc shapes continuous to respective end portions of first edge lines 22 and 22, and a middle part of the second edge line 32 extends linearly orthogonal to the center line of symmetry J1. Similar to the first embodiment, a part of the third side face 16 is cut off flat to form a fourth side face 17B, and the fourth side face 17B serves as a relief face of the second cutting blade portion 31. In addition, the gear edge cut-off tool 10W is provided on a distal end side of the shaft portion 14 with a small diameter portion 13W having a circular shape in section in place of the band plate portion 13 (refer to FIG. 3) of the above first embodiment, and is provided beyond the same with the distal end plate portion 15.

Fifth Embodiment

Figure 16:
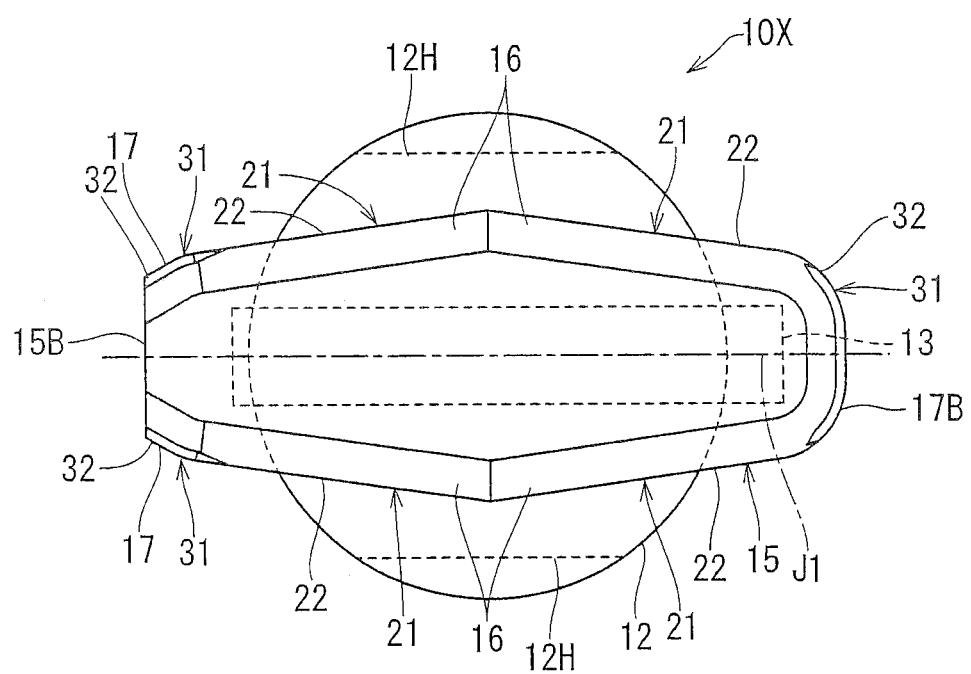
FIG. 16 is a partially enlarged side view of a distal end portion of a gear edge cut-off tool of a fifth embodiment.

FIG. 16 shows a gear edge cut-off tool 10X of a fifth embodiment of the present invention. This gear edge cut-off tool 10X forms a structure for which the end portion close to the first side face 15A (refer to FIG. 6) of the distal end plate portion 15 of the gear edge cut-off tool 10 of the first embodiment is joined to an end portion close to the first side face 15A (refer to FIG. 14) of the distal end plate portion 15 of the gear edge cut-off tool 10V of the third embodiment. This structure allows appropriately selecting a second cutting blade portion 31 to cut off the bottom edge 92A.

Sixth Embodiment

Figure 17A:
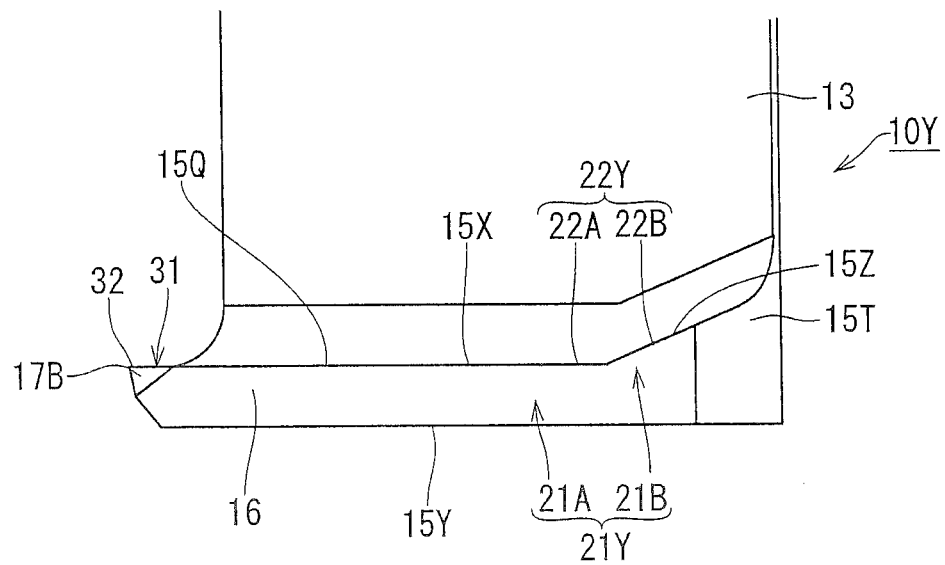
FIG. 17A is a partially enlarged side view of a distal end portion of a gear edge cut-off tool of a sixth embodiment.
Figure 17B:
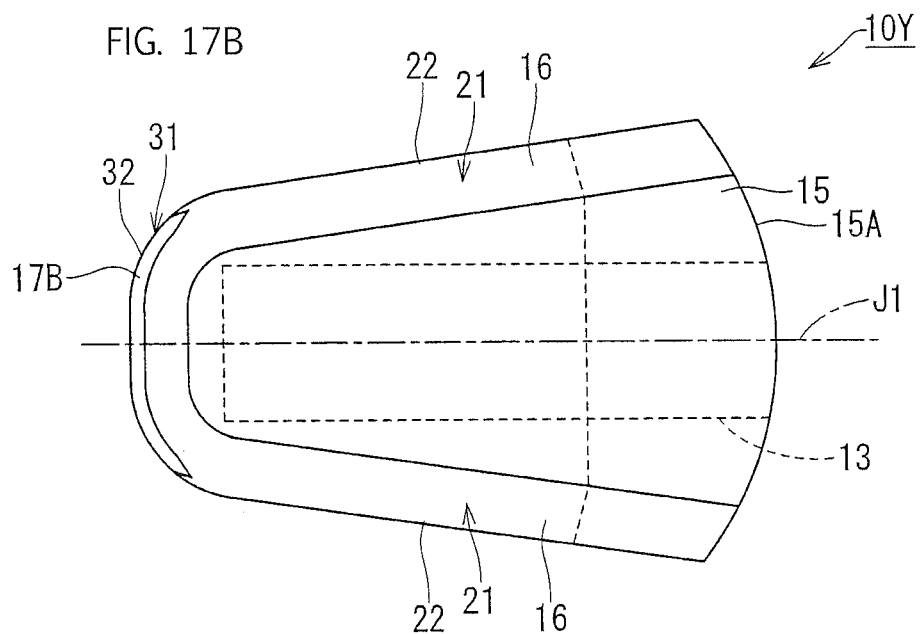
FIG. 17B is a plan view of the gear edge cut-off tool.
Figure 18:
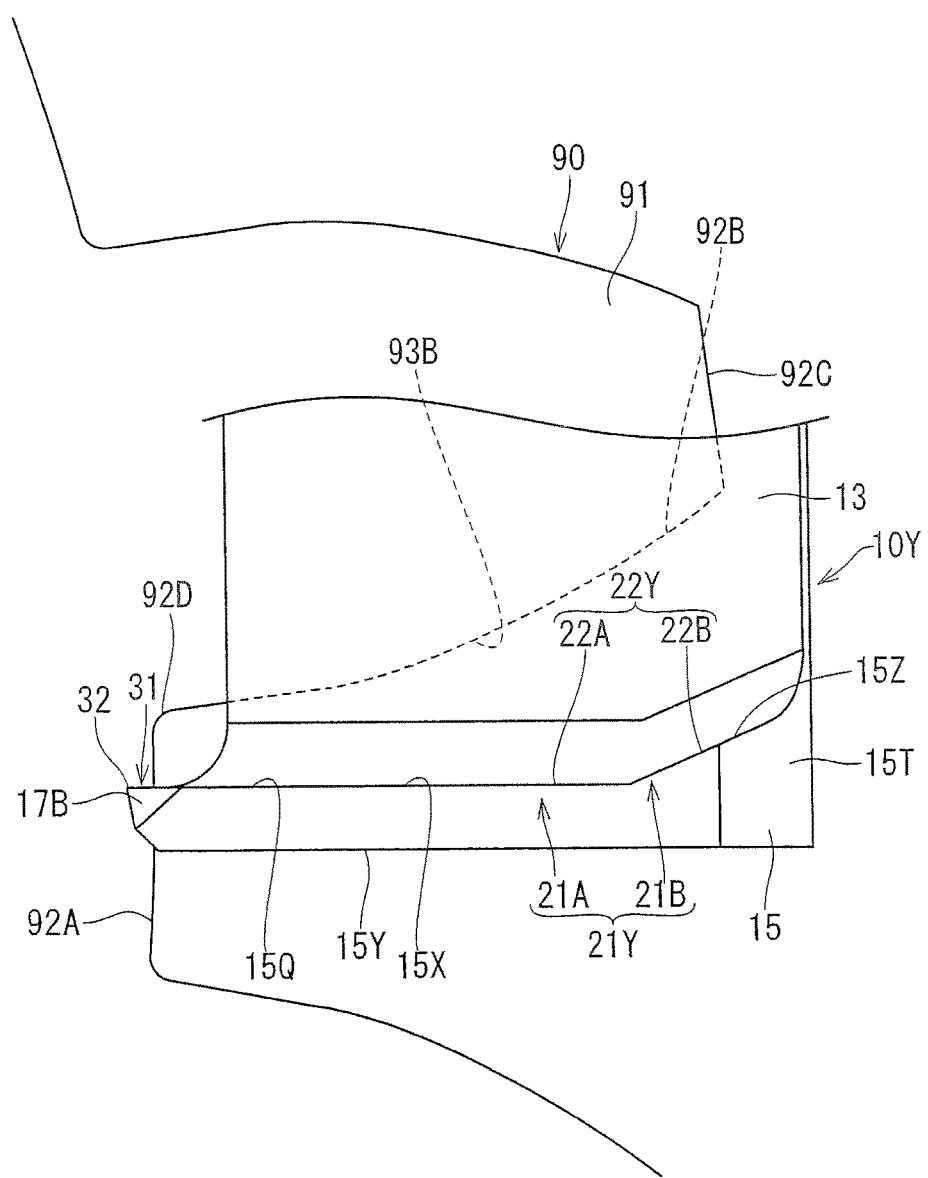
FIG. 18 is a side view of the gear edge cut-off tool in a state of cutting off a side edge, viewed in a face width direction.

A gear edge cut-off tool 10Y of the present embodiment is shown in FIG. 17 and FIG. 18. As shown in FIG. 17, the gear edge cut-off tool 10Y is modified from the gear edge cut-off tool 10 (refer to FIG. 5) of the above first embodiment, and has a shape bent at the first main plane 15X. Specifically, the first main plane 15X (rake face) is composed of an orthogonal flat face 15Q and an inclined plane 15Z. The orthogonal flat face 15Q is orthogonal to a center axis of the large diameter portion 12 (refer to FIG. 3). The inclined plane 15Z is one side face of a projection 15T gradually inclined toward the band plate portion 13 from a position closer to the first side face 15A in the first main plane 15X toward an end portion close to the first side face 15A. Moreover, a sub-first cutting blade portion 21B extending to the side of the projection 15T and using the third side face 16 as a relief face is provided. The section between the sub-first cutting blade portion 21B and the second cutting blade portion 31 is provided as a main first cutting blade portion 21A using the first main plane 15X as a rake face and using the third side face 16 as a relief face, and the main first cutting blade portion 21A and the sub-first cutting blade portion 21B compose a first cutting blade portion 21Y according to the present invention. Accordingly, a rake face of the first cutting blade portion 21Y as a whole is formed as a structure bent in a concave shape. A first edge line 22Y that is an edge line of the first cutting blade portion 21Y is composed of a main first edge line 22A and a sub-first edge line 22B, and the first edge line 22Y as a whole also has a bent shape.

According to the gear edge cut-off tool 10Y of the present embodiment, as shown in FIG. 18, composing the first main plane 15X being a rake face of the orthogonal flat face 15Q that is flat and the inclined plane 15Z that is inclined with respect to the orthogonal flat face 15Q allows suppressing deviation of a crossing angle δ of the tooth surface 93B of the tooth 91 being an involute curved surface with the rake face, as compared with a gear edge cut-off tool the rake face of which is composed only of a flat face. Although the rake face is composed of the orthogonal flat face 15Q and the inclined plane 15Z in the present embodiment, the rake face may be a composition having two or more inclined planes provided for the orthogonal flat face 15Q, or may be composed of the orthogonal flat face 15Q and a curved surface for which the inclined plane 15Z is curved.

Seventh Embodiment

Figure 19:
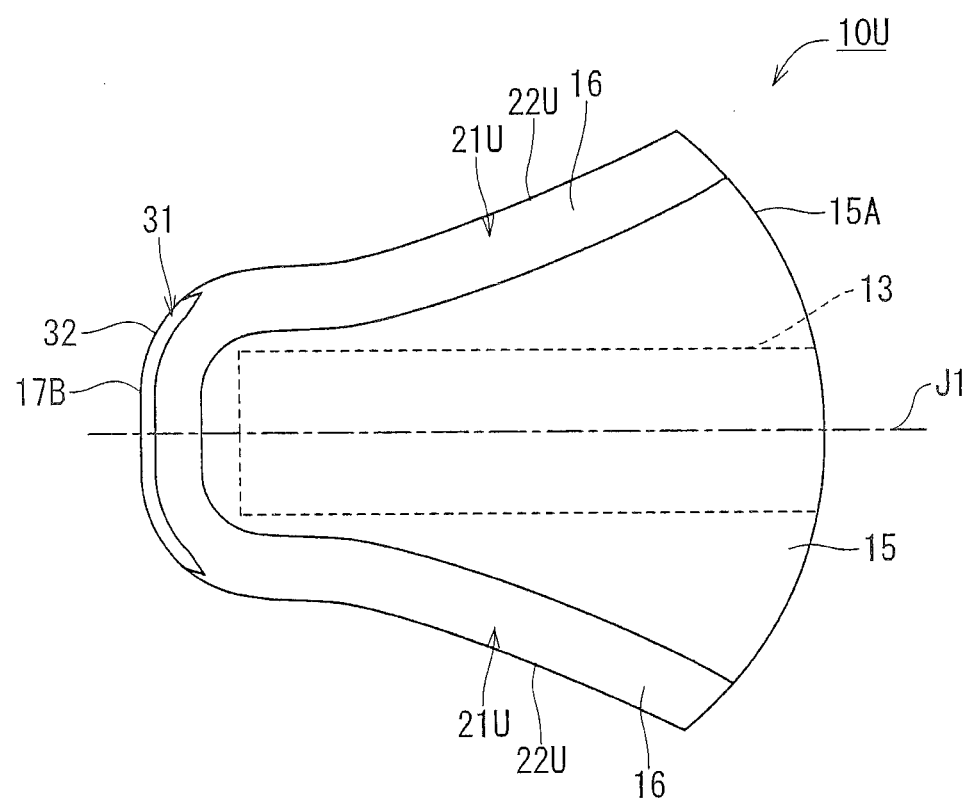
FIG. 19 is a plan view of a gear edge cut-off tool of a seventh embodiment.

A gear edge cut-off tool 10U of the present embodiment is shown in FIG. 19. This gear edge cut-off tool 10U is modified from the gear edge cut-off tool 10W of the fourth embodiment. When the distal end plate portion 15 is viewed in an axial direction of the gear edge cut-off tool 10U, the third side face 16 being a relief face of the first cutting blade portion 21U is curved in a concave shape, and the first edge line 22U is curved in a concave shape. More specifically, the third side face 16 and the first edge line 22U are curved so as to draw an involute curve. This configuration also allows efficiently cutting off the side edge 92B of the tooth 91 of the involute gear by the first cutting blade portion 21U.

Eighth Embodiment

Figure 20:
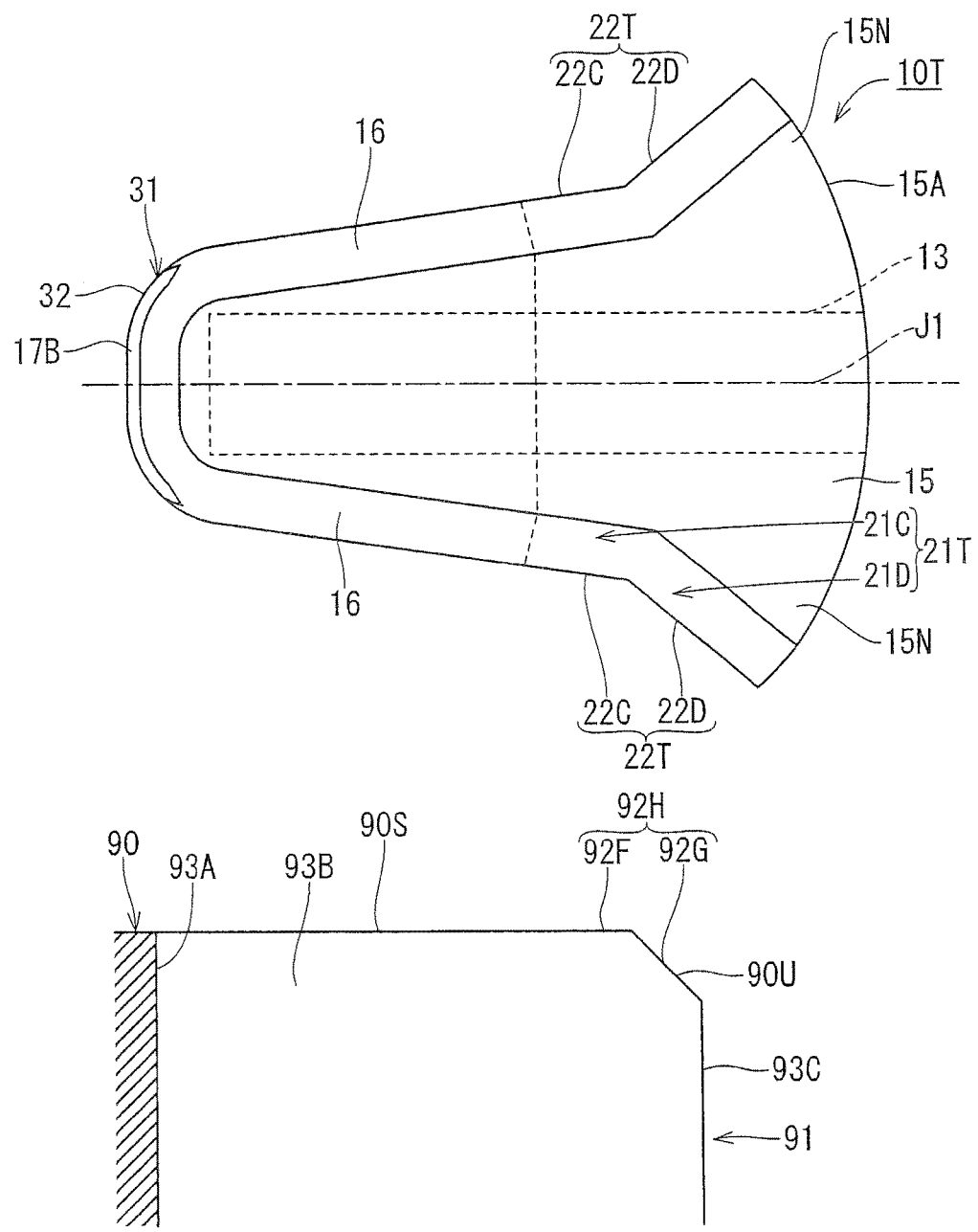
FIG. 20 is a side view of a gear edge cut-off tool of an eighth embodiment before being applied to a gear wheel.

A gear edge cut-off tool 10T of the present embodiment is shown in FIG. 20. This gear edge cut-off tool 10T is modified from the gear edge cut-off tool 10W of the fourth embodiment. The gear edge cut-off tool 10T forms a structure, as viewed in an axial direction of the gear edge cut-off tool 10T, including overhanging portions 15N and 15N formed by making end portions close to the first side face 15A of first cutting blade portions 21T and 21T overhang to both sides of the distal end plate portion 15. Moreover, each first cutting blade portion 21T is composed of a sub-first cutting blade portion 21D formed in the overhanging portion 15N and a main first cutting blade portion 21C close to the second cutting blade portion 31 relative to the sub-first cutting blade portion 21D, and a first cut line 22T has a bent shape for which a sub-first edge line 22D and a main first edge line 22C are crossed with each other. According to the gear edge cut-off tool 10T, a distal end-side side edge 92G formed by an inclined portion 90U of the gear side face 90S at a distal end side of the tooth 91 and the tooth surface 93B crossing each other can be removed by the sub-first cutting blade portion 21D of the gear edge cut-off tool 10T.

Ninth Embodiment

Figure 21:
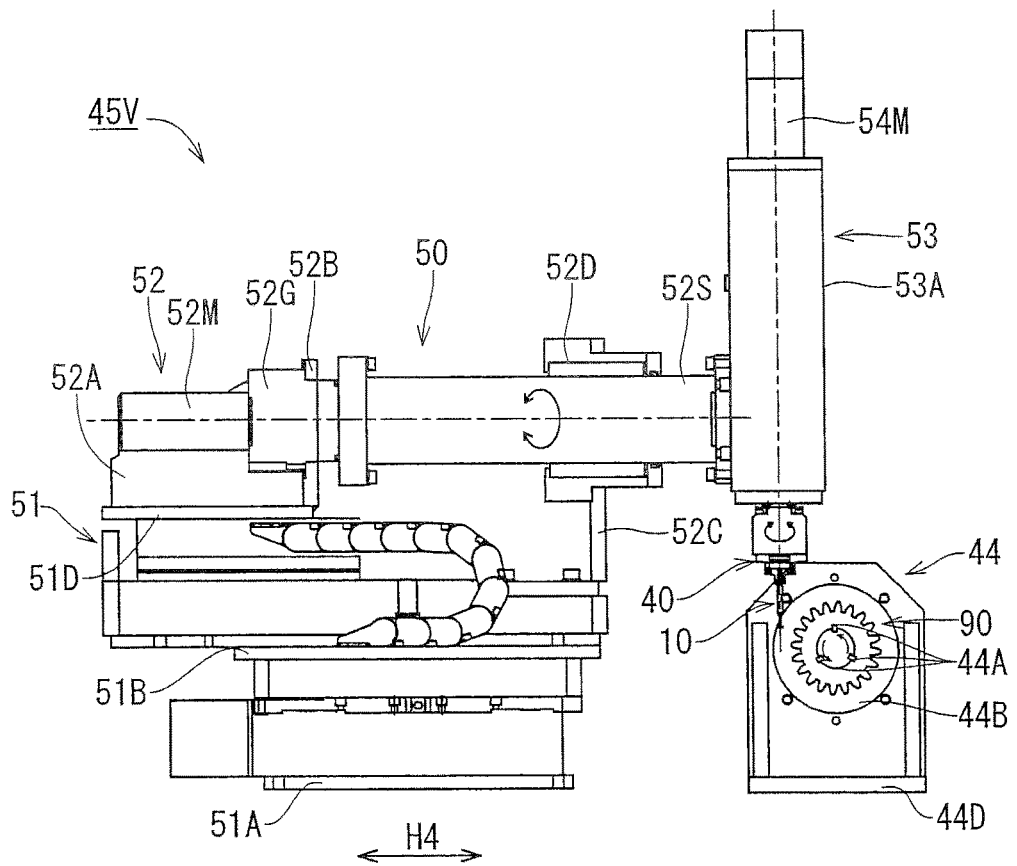
FIG. 21 is a front view of a gear edge cut-off device of a ninth embodiment.
Figure 22:
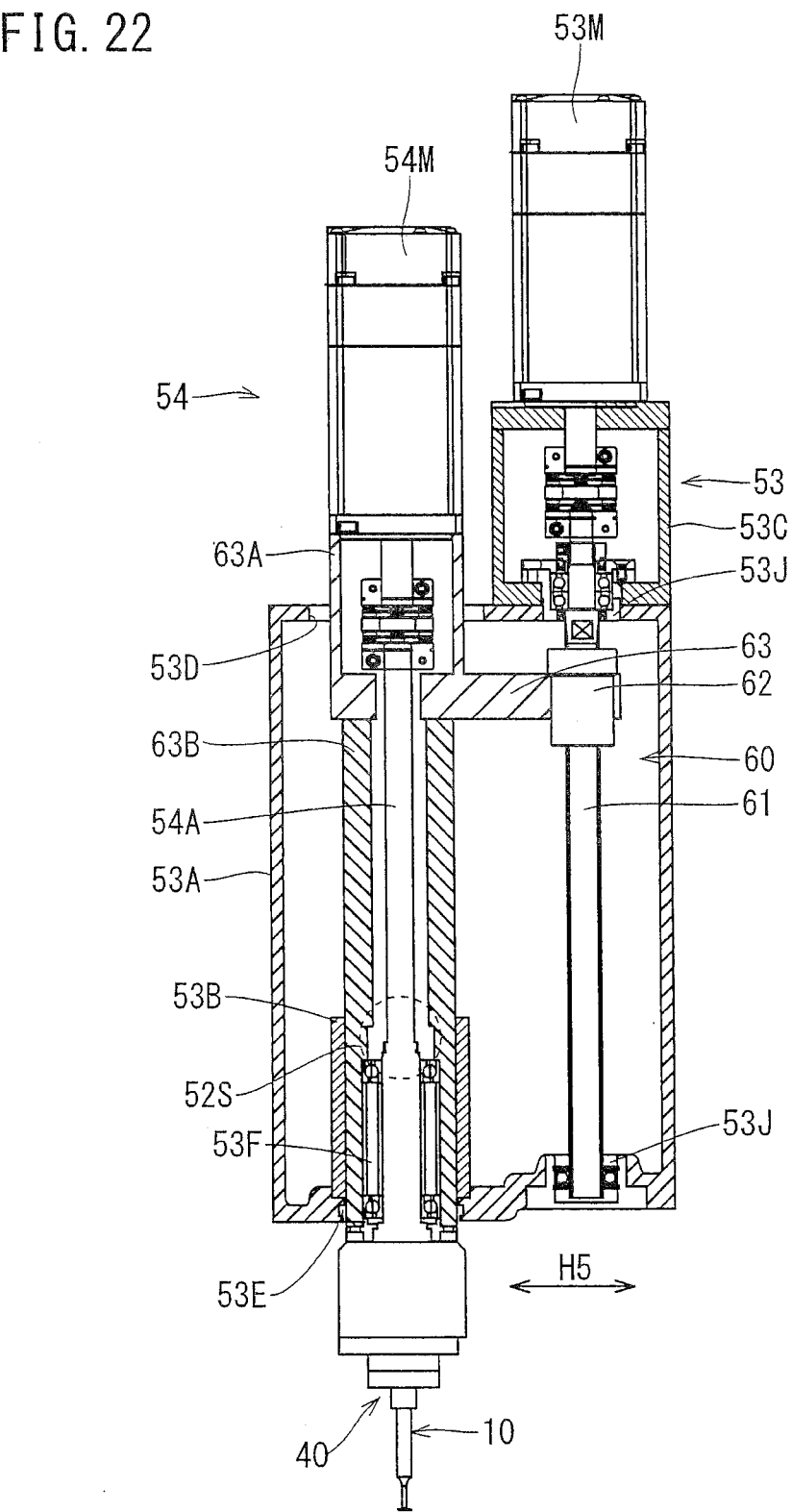
FIG. 22 is aside sectional view of the gear edge cut-off device.

A gear edge cut-off device 45V of the present embodiment is shown in FIG. 21 and FIG. 22, and includes a robot 50 that holds the tool holder 40 described in the first embodiment. Moreover, the gear edge cut-off tool 10 held by the tool holder 40 is positioned by teaching playback of the robot 50 with respect to the gear wheel 90 held by the rotating jig 44.

Specifically, the robot 50 has an XY table 51 serving as "a first drive mechanism" according to the present invention, and the XY table 51 has a first base portion 51A fixed to a support member (not shown) that is the same as with the base portion 44D of the rotating jig 44. Moreover, with respect to the first base portion 51A, a first movable table 51B linearly moves in a first horizontal direction H5 (refer to FIG. 22) orthogonal to the sheet surface of FIG. 21, and a second movable table 51D linearly moves in a second horizontal direction H4 orthogonal to the first horizontal direction H5 with respect to the first movable table 51B. In addition, the rotating jig 44 has a rotation axis parallel to the first horizontal direction H5 (refer to FIG. 22). The XY table 51 includes two servomotors (not shown) and two ball screw mechanisms (not shown) that convert rotation outputs of the servomotors into linear motions, and by the servomotors and ball screw mechanisms, the second movable table 51D serving as a "first output unit" according to the present invention is controlled so as to be positioned in an arbitrary position of a horizontal two-dimensional plane.

The second movable table 51D is loaded with a y-axis rotation mechanism 52 serving as a "second drive mechanism" according to the present invention. The y-axis rotation mechanism 52 includes a base portion 52A and a decelerator 52G fixed onto the second movable table 51D in a fixed manner. The decelerator 52G includes, for example, an input unit and an output unit coaxially at the front and rear, and the rotation axis is parallel to the second horizontal direction H4 in the foregoing. Moreover, the input section of the decelerator 52G is coupled with a servomotor 52M, and to the output unit of the decelerator 52G, a rotating sleeve 52S serving as a "second output unit" of the present invention is mounted. The rotating sleeve 52S has a cylindrical shape extending in the second horizontal direction H4. A middle part of the rotating sleeve 52S is supported so as to be rotatable and linearly movable by a bearing portion 52D of a second erected support portion 52C erected from the first movable table 51B.

To a distal end portion of the rotating sleeve 52S, a Z-axis linear motion mechanism 53 serving as a "third drive mechanism" of the present invention is mounted. The Z-axis linear motion mechanism 53 has a base portion 53A mounted to the distal end of the rotating sleeve 52S. The base portion 53A has, for example, a housing structure extending in the vertical direction, and its planar shape has a rectangular shape longer in the first horizontal direction H5.

As shown in FIG. 22, in a position closer to one end in the first horizontal direction H5 of the base portion 53A, a ball screw 61 of a ball structure mechanism 60 penetrates vertically, and both end portions of the ball screw 61 are rotatably supported by bearing portions 53J and 53J provided in the base portion 53A. Moreover, the ball screw 61 is driven to rotate by a servomotor 53M mounted to the base portion 53A via a relay box 53C.

To a ball nut 62 of the ball screw mechanism 60, a linear motion base 63 serving as a "third output unit" of the present invention is fixed. The linear motion base 63 extends from the ball nut 62 to the other end side in the first horizontal direction H5, and includes an upper cylindrical portion 63A in a cylindrical shape extending upward from its distal end portion and a lower cylindrical portion 63B in a cylindrical shape extending downward. The upper cylindrical portion 63A is inserted through a through-hole 53D in an upper portion of the base portion 53A, and the lower cylindrical portion 63B is supported so as to be linearly movable by a bearing portion 53B provided in the base portion 53A. Accordingly, the linear motion base 63 moves up and down when the ball screw 61 is driven to rotate.

On the linear motion base 63, a θ-axis rotation mechanism serving as a "fourth drive mechanism" of the present invention is mounted. The θ-axis rotation mechanism 54 has a servomotor 54M mounted to an upper end portion of the upper cylindrical portion 63A, and an output shaft of the servomotor 54M is disposed in the upper cylindrical portion 63A. To the output shaft of the servomotor 54M, a rotary shaft 54A serving as a "fourth output unit" of the present invention is coupled integrally rotatably to extend downward, and is projecting from a lower face of the base portion 53A. Moreover, the tool holder 40 is fixed to a lower end portion of the rotary shaft 54A, and the gear edge cut-off tool 10 is disposed coaxially with the rotary shaft 54A. A middle part of the θ-axis rotation mechanism 54 is supported so as to be linearly movable by a bearing portion 53F provided in a through-hole 53E of the base portion 53A.

The gear edge cut-off device 45V of the present embodiment, as described at the beginning, allows positioning the gear edge cut-off tool 10 by teaching playback of the robot 50 with respect to the gear wheel 90 held by the rotating jig 44 to efficiently cut off edges of the gear wheel 90.

Other Embodiments

The present invention is not limited to the above-mentioned embodiment, and for example, such embodiments as to be described in the following are also included in the technical scope of the present invention, and further, the present invention can be carried out by various modifications within the scope not deviating from the gist thereof.

(1) In the above-mentioned respective embodiments, a spur gear is exemplified as a workpiece to be subjected to edge removal by a gear edge cut-off tool, but the workpiece may be a helical gear (a gear the face width direction H2 of which is inclined with respect to the rotation axis direction). Alternatively, a rack may be a workpiece to be subjected to edge removal by a gear edge cut-off tool.

Figure 23:
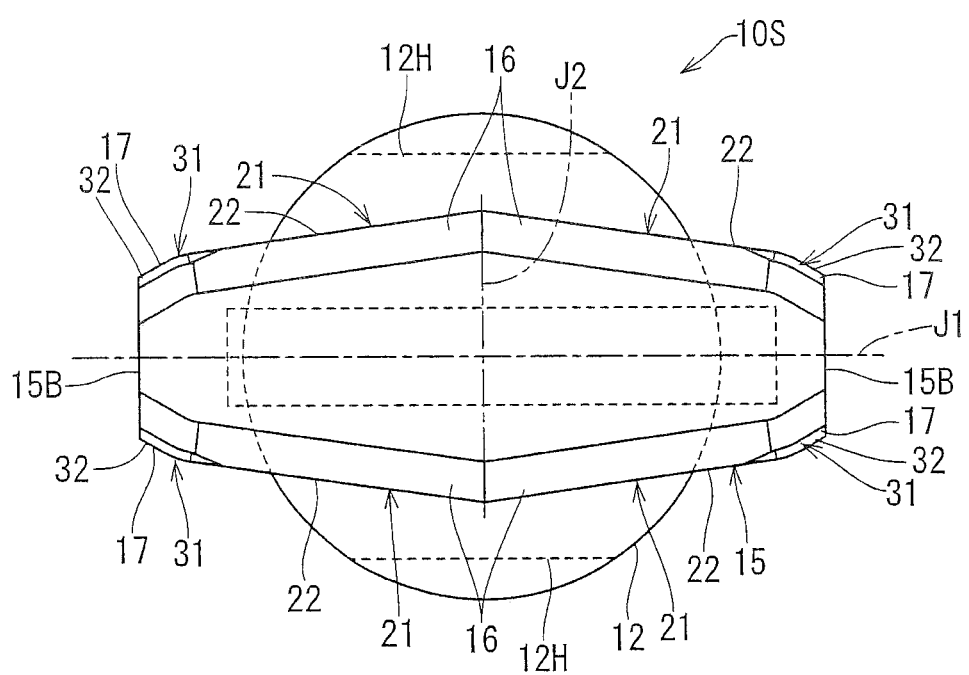
FIG. 23 is a plan view of a gear edge cut-off tool of a modification example of the present invention.

The gear edge cut-off tool 10X (refer to FIG. 16) of the above-mentioned fifth embodiment includes the two types of second cutting blade portions 31 at both ends, but may include the same type of second cutting blade portions 31 at both end portions as in a gear edge cut-off tool 10S shown in FIG. 23 such that the distal end plate portion 15 has a shape line-symmetric with respect to both of the center line of symmetry J1 and a line J2 orthogonal to the center line of symmetry J1. Employing such a configuration suppresses wear and tear of the first cutting blade portions 21 and the second cutting blade portions 31, which makes it possible to use the gear edge cut-off tool 10S over a long period of time, and allows reducing the amount to rotate the gear edge cut-off tool 10S by the θ-axis rotation mechanism 54 when the gear edge cut-off tool 10S is attached to the robot 50 (refer to FIG. 21) as shown in the ninth embodiment, making the actions of the robot 50 simple.

Figure 24:
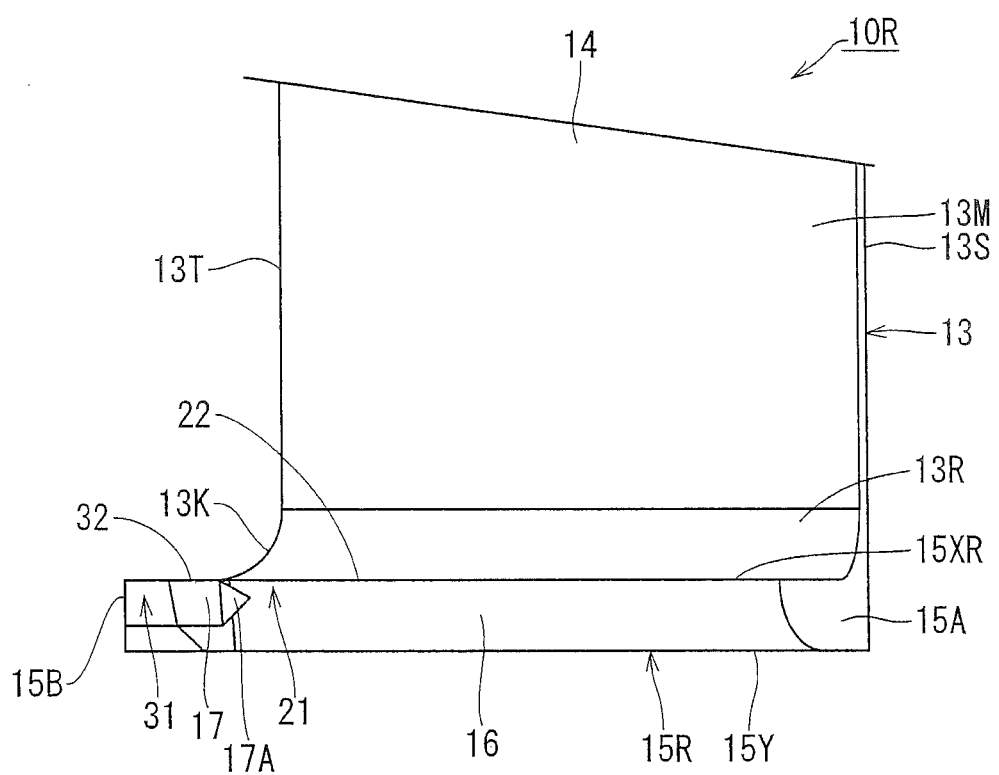
FIG. 24 is a partially enlarged side view of a distal end portion of a gear edge cut-off tool of a reference example.

Although this does not belong to the technical field of the present invention, even a gear edge cut-off tool having a first main plane 15R being a rake face composed only of a flat face can smoothly cut off side edges and bottom edges of the gearwheel 90 as long as it has first cutting blade portions 21 and second cutting blade portions 31, as shown in FIG. 24.

DESCRIPTION OF THE REFERENCE NUMERAL 10, 10P-10Y Gear edge cut-off tool
14 Shaft portion
15 Distal end plate portion
21, 21T, 21U, 21Y First cutting blade portion (cutting blade)
22, 22T, 22U, 22Y First edge line (edge line)
31 Second cutting blade portion
32 Second edge line
40 Tool holder
45, 45V Gear edge cut-off device
50 Robot
51 XY table (first drive mechanism)
52 α-axis rotation mechanism (second drive mechanism)
53 Z-axis linear motion mechanism (third drive mechanism)
54 θ-axis rotation mechanism (fourth drive mechanism)
90 Gear wheel (gear)
90S Gear side face
91 Teeth
92A Bottom edge
92B Side edge
92D Corner edge
J1 Center line of symmetry

The invention claimed is:

1. A gear edge cut-off tool including a cutting blade to be disposed between adjoining teeth of a gear and applied with an edge line obliquely crossed to a side edge of one tooth, the cutting blade cutting off the side edge from a dedendum side toward an addendum side while gradually coming out in a face width direction from between the adjoining teeth when the cutting blade is relatively moved in a tooth thickness direction with respect to the tooth, wherein a rake face of the cutting blade is curved or bent in a concave shape in the edge line direction.

2. The gear edge cut-off tool according to claim 1, wherein the rake face of the cutting blade is provided as an involute curved surface.

3. The gear edge cut-off tool according to claim 1, comprising:
a shaft portion; and
a distal end plate portion overhanging laterally from a distal end of the shaft portion, having the cutting blade at an outer edge portion,
an inner face of the distal endplate portion facing the shaft portion side forming the rake face of the cutting blade, and
a side face of the distal end plate portion forming a relief face of the cutting blade.

4. The gear edge cut-off tool according to claim 2, comprising:
a shaft portion; and
a distal end plate portion overhanging laterally from a distal end of the shaft portion, having the cutting blade at an outer edge portion,
an inner face of the distal endplate portion facing the shaft portion side forming the rake face of the cutting blade, and
a side face of the distal end plate portion forming a relief face of the cutting blade.

5. The gear edge cut-off tool according to claim 3, wherein the distal end plate portion has a line-symmetric shape, and has the cutting blades at both sides across its center line of symmetry.

6. The gear edge cut-off tool according to claim 4, wherein the distal end plate portion has a line-symmetric shape, and has the cutting blades at both sides across its center line of symmetry.

7. The gear edge cut-off tool according to claim 5, wherein the edge line of the cutting blade is inclined so as to approximate the center line of symmetry toward the dedendum side of the gear, and its inclination angle is set to an angle such that the cutting blade is suitably applied to the side edge when the center line of symmetry is disposed in parallel with the gear side face.

8. The gear edge cut-off tool according to claim 6, wherein the edge line of the cutting blade is inclined so as to approximate the center line of symmetry toward the dedendum side of the gear, and its inclination angle is set to an angle such that the cutting blade is suitably applied to the side edge when the center line of symmetry is disposed in parallel with the gear side face.

9. The gear edge cut-off tool according to claim 5, wherein the distal end plate portion shows a shape line-symmetric with respect to both of the center line of symmetry and a line orthogonal to the center line of symmetry.

10. The gear edge cut-off tool according to claim 6, wherein the distal end plate portion shows a shape line-symmetric with respect to both of the center line of symmetry and a line orthogonal to the center line of symmetry.

11. The gear edge cut-off tool according to claim 7, wherein the distal end plate portion shows a shape line-symmetric with respect to both of the center line of symmetry and a line orthogonal to the center line of symmetry.

12. The gear edge cut-off tool according to claim 8, wherein the distal end plate portion shows a shape line-symmetric with respect to both of the center line of symmetry and a line orthogonal to the center line of symmetry.

13. A gear edge cut-off device comprising:
the gear edge cut-off tool according to claim 3;
a rotating jig that holds and rotates the gear;
a tool holder that holds and tiltably supports the shaft portion of the gear edge cut-off tool in a direction parallel to a rotation axis direction of the rotating jig and biases the gear edge cut-off tool into a fixed tilting posture.

14. A gear edge cut-off device comprising:
the gear edge cut-off tool according to claim 5;
a rotating jig that holds and rotates the gear;
a tool holder that holds and tiltably supports the shaft portion of the gear edge cut-off tool in a direction parallel to a rotation axis direction of the rotating jig and biases the gear edge cut-off tool into a fixed tilting posture.

15. A gear edge cut-off device comprising:
the gear edge cut-off tool according to claim 7;
a rotating jig that holds and rotates the gear;
a tool holder that holds and tiltably supports the shaft portion of the gear edge cut-off tool in a direction parallel to a rotation axis direction of the rotating jig and biases the gear edge cut-off tool into a fixed tilting posture.

16. A gear edge cut-off device comprising:
the gear edge cut-off tool according to claim 9;
a rotating jig that holds and rotates the gear;
a tool holder that holds and tiltably supports the shaft portion of the gear edge cut-off tool in a direction parallel to a rotation axis direction of the rotating jig and biases the gear edge cut-off tool into a fixed tilting posture.

17. The gear edge cut-off device according to claim 13, comprising a robot including: a first drive mechanism having a first output unit that can be controlled so as to be positioned in an arbitrary position of a two-dimensional plane;
a second drive mechanism having a second output unit that is mounted to the first output unit and rotates about a rotation axis parallel to the two-dimensional plane;
a third drive mechanism having a third output unit that is mounted to the second output unit and linearly moves in a direction orthogonal to the rotation axis of the second output unit; and
a fourth drive mechanism having a fourth output unit that is mounted to the third output unit and rotates about a rotation axis parallel to the linearly moving direction of the third output unit, wherein
the tool holder is fixed to the fourth output unit in such a manner that the shaft portion of the gear edge cut-off tool is extended along the rotation axis direction of the fourth output unit, and
the rotating jig is disposed in such a manner that its rotation axis is oriented in a direction parallel to the two-dimensional plane and orthogonal to the rotation axis of the second output unit.

18. The gear edge cut-off device according to claim 14, comprising a robot including: a first drive mechanism having a first output unit that can be controlled so as to be positioned in an arbitrary position of a two-dimensional plane;
a second drive mechanism having a second output unit that is mounted to the first output unit and rotates about a rotation axis parallel to the two-dimensional plane;
a third drive mechanism having a third output unit that is mounted to the second output unit and linearly moves in a direction orthogonal to the rotation axis of the second output unit; and a fourth drive mechanism having a fourth output unit that is mounted to the third output unit and rotates about a rotation axis parallel to the linearly moving direction of the third output unit, wherein the tool holder is fixed to the fourth output unit in such a manner that the shaft portion of the gear edge cut-off tool is extended along the rotation axis direction of the fourth output unit, and the rotating jig is disposed in such a manner that its rotation axis is oriented in a direction parallel to the two-dimensional plane and orthogonal to the rotation axis of the second output unit.

19. The gear edge cut-off device according to claim 15, comprising a robot including: a first drive mechanism having a first output unit that can be controlled so as to be positioned in an arbitrary position of a two-dimensional plane;

a second drive mechanism having a second output unit that is mounted to the first output unit and rotates about a rotation axis parallel to the two-dimensional plane;

a third drive mechanism having a third output unit that is mounted to the second output unit and linearly moves in a direction orthogonal to the rotation axis of the second output unit; and a fourth drive mechanism having a fourth output unit that is mounted to the third output unit and rotates about a rotation axis parallel to the linearly moving direction of the third output unit, wherein the tool holder is fixed to the fourth output unit in such a manner that the shaft portion of the gear edge cut-off tool is extended along the rotation axis direction of the fourth output unit, and the rotating jig is disposed in such a manner that its rotation axis is oriented in a direction parallel to the two-dimensional plane and orthogonal to the rotation axis of the second output unit.

20. The gear edge cut-off device according to claim 16, comprising a robot including: a first drive mechanism having a first output unit that can be controlled so as to be positioned in an arbitrary position of a two-dimensional plane;

a second drive mechanism having a second output unit that is mounted to the first output unit and rotates about a rotation axis parallel to the two-dimensional plane;

a third drive mechanism having a third output unit that is mounted to the second output unit and linearly moves in a direction orthogonal to the rotation axis of the second output unit; and a fourth drive mechanism having a fourth output unit that is mounted to the third output unit and rotates about a rotation axis parallel to the linearly moving direction of the third output unit, wherein the tool holder is fixed to the fourth output unit in such a manner that the shaft portion of the gear edge cut-off tool is extended along the rotation axis direction of the fourth output unit, and the rotating jig is disposed in such a manner that its rotation axis is oriented in a direction parallel to the two-dimensional plane and orthogonal to the rotation axis of the second output unit.

\* \* \* \* \*